(12) United States Patent
Kishimoto et al.

(10) Patent No.: US 11,789,496 B2
(45) Date of Patent: Oct. 17, 2023

(54) DIGITIZER AND ELECTRONIC APPARATUS WITH FOLDABLE BASE MEMBER INCLUDING THROUGH HOLES

(71) Applicant: Samsung Display Co., Ltd., Yongin-Si (KR)

(72) Inventors: Hirotsugu Kishimoto, Gyeonggi-do (KR); Hyun-Been Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/355,667

(22) Filed: Jun. 23, 2021

(65) Prior Publication Data

US 2022/0075416 A1 Mar. 10, 2022

(30) Foreign Application Priority Data

Sep. 4, 2020 (KR) .................. 10-2020-0112903

(51) Int. Cl.
*G06F 1/16* (2006.01)
*G06F 3/041* (2006.01)
*G06F 3/044* (2006.01)

(52) U.S. Cl.
CPC .......... *G06F 1/1643* (2013.01); *G06F 1/1616* (2013.01); *G06F 3/0412* (2013.01); *G06F 3/0445* (2019.05); *G06F 3/0446* (2019.05)

(58) Field of Classification Search
CPC .... G06F 1/1643; G06F 1/1616; G06F 3/0412; G06F 3/0445; G06F 3/0446
See application file for complete search history.

(56) References Cited

U.S. PATENT DOCUMENTS

| 9,971,177 | B2 | 5/2018 | Lee | |
|---|---|---|---|---|
| 2015/0123940 | A1* | 5/2015 | Park | G06F 3/0441 345/174 |
| 2016/0188098 | A1* | 6/2016 | Her | G06F 1/1652 345/173 |
| 2018/0088713 | A1* | 3/2018 | Yang | H01L 27/323 |
| 2018/0356916 | A1* | 12/2018 | Choi | G06F 3/0445 |
| 2019/0173052 | A1 | 6/2019 | Oh et al. | |
| 2019/0204867 | A1* | 7/2019 | Song | G06F 1/1652 |
| 2020/0209998 | A1* | 7/2020 | Shin | G06F 1/1641 |
| 2021/0181918 | A1* | 6/2021 | Wu | G06F 3/04166 |
| 2021/0352814 | A1* | 11/2021 | Park | G06F 1/1656 |
| 2022/0113854 | A1* | 4/2022 | He | G06F 3/0448 |
| 2022/0308625 | A1* | 9/2022 | Gao, Sr. | G06F 1/1616 |

FOREIGN PATENT DOCUMENTS

KR 102236168 B1 4/2021

* cited by examiner

*Primary Examiner* — Liliana Cerullo

(74) *Attorney, Agent, or Firm* — CANTOR COLBURN LLP

(57) ABSTRACT

A digitizer includes a base member including a front surface and a rear surface opposing the front surface, first sensing lines disposed on the base member, arranged in a second direction, and extending in a first direction crossing the first direction, and second sensing lines disposed on the base member, spaced apart from the first sensing lines, arranged in the first direction, and extending in the second direction. The base member is foldable about an imaginary folding axis extending in the second direction and is provided with a through-hole penetrating at least a portion of the base member. The through-hole is surrounded by the first sensing lines and the second sensing lines.

16 Claims, 17 Drawing Sheets

DIGITIZER AND ELECTRONIC APPARATUS WITH FOLDABLE BASE MEMBER INCLUDING THROUGH HOLES This application claims priority to Korean Patent Application No. 10-2020-0112903, filed on Sep. 4, 2020, and all the benefits accruing therefrom under 35 U.S.C. § 119, the content of which in its entirety is herein incorporated by reference.

BACKGROUND

1. Field of Disclosure

The present disclosure relates to an electronic apparatus. More particularly, the present disclosure relates to an electronic apparatus including a digitizer with improved folding characteristics.

2. Description of the Related Art

In the information society, an electronic apparatus is becoming increasingly important as media for transmission of visual information. As currently known electronic apparatuses, there are a liquid crystal display ("LCD"), a plasma display panel ("PDP"), an organic light emitting display ("OLED"), a field effect display ("FED"), and an electrophoretic display ("EPD").

The electronic apparatus is activated in response to electrical signals applied thereto. The electronic apparatus includes a digitizer that senses an external input applied thereto from the outside of a display panel displaying an image.

The electronic apparatus includes various electrode patterns to be activated by the electrical signals. Areas in which the electrode patterns are activated display information or respond to the external signal.

SUMMARY

The present disclosure provides an electronic apparatus including a digitizer with improved folding characteristics by defining a through-hole through a base member of the digitizer.

Embodiments of the inventive concept provide a digitizer including a base member including a front surface and a rear surface opposing the front surface, first sensing lines disposed on the base member, arranged in a first direction, and extending in a second direction crossing the first direction, and second sensing lines disposed on the base member, spaced apart from the first sensing lines, arranged in the second direction, and extending in the first direction. The base member is foldable about an imaginary folding axis extending in the second direction and is provided with a through-hole penetrating at least a portion thereof, and the through-hole is surrounded by the first sensing lines and the second sensing lines.

The through-hole may have a width equal to or greater than about 10 micrometers and equal to or smaller than about 300 micrometers in the first direction.

The through-hole may be provided in plural, and the through-holes may be arranged in the first direction and the second direction to be spaced apart from each other.

The first and second sensing lines may be embedded in the base member.

The base member may include a first line area in which the first sensing line is disposed, where the first sensing lines are adjacent to the front surface of the base member, a second line area in which the second sensing line is disposed, where the second sensing lines are adjacent to the rear surface of the base member, and a non-line area defined between the first line area and the second line area in a plan view. The through-hole may overlap the non-line area in the plan view and penetrate the base member from the front surface of the base member to the rear surface of the base member.

The base member may define a first additional hole which overlaps the first line area in the plan view and is defined from the rear surface of the base member with a certain depth.

The base member may define a second additional hole which overlaps the second line area in the plan view and is defined from the front surface of the base member with a certain depth.

The base member may include polyimide.

The base member may include a base layer including a front surface on which the first sensing lines are disposed and a rear surface on which the second sensing lines are disposed, a first photosensitive resin layer disposed on the front surface of the base layer and providing the front surface of the base member, and a second photosensitive resin layer disposed on the rear surface of the base layer and providing the rear surface of the base member. The rear surface may face the front surface. The front surface of the base layer may include a first line area in which the first sensing lines are disposed and a first non-line area defined between the first sensing lines, and the rear surface of the base layer includes a second line area in which the second sensing lines are disposed and a second non-line area defined between the second sensing lines.

The through-hole may include a first through-hole overlapping the first non-line area in the plan view and penetrating the first photosensitive resin layer to expose the front surface of the base layer and a second through-hole overlapping the second non-line area in the plan view and penetrating the second photosensitive resin layer to expose the rear surface of the base layer.

The base member may further define a first additional hole overlapping the first line area and defined from the front surface of the base member with a certain depth and a second additional hole overlapping the second line area and defined from the rear surface of the base member with a certain depth.

The through-hole may include a first through-hole and a second through-hole which have different widths from each other.

The through-hole may have a width equal to or greater than about 1 millimeter and equal to or smaller than about 5 millimeters in the second direction.

The through-hole may have a depth equal to or greater than about 10 micrometers and equal to or smaller than about 50 micrometers in a third direction. The third direction may cross the first direction and the second direction.

Embodiments of the inventive concept provide an electronic apparatus including a window, a display module disposed under the window, and a digitizer disposed under the display module. The digitizer includes a base member including a front surface adjacent to the display module and a rear surface opposing the front surface; and first and second sensing lines disposed on the base member, arranged in a first direction and a second direction, respectively, spaced apart and insulated from each other. The second direction crosses the first direction. The display module is foldable about an imaginary folding axis extending in the second direction, the digitizer is provided with a through-hole penetrating at least a portion of the base member, and the through-hole is surrounded by the first sensing lines and the second sensing lines.

The through-hole may have a width equal to or greater than about 10 micrometers and equal to or smaller than about 300 micrometers in the first direction.

The first and second sensing lines may be embedded in the base member.

The base member may include a first line area in which the first sensing line is disposed, a second line area in which the second sensing line is disposed, and a non-line area defined between the first line area and the second line area in a plan view. The through-hole may overlap the non-line area in the plan view and penetrate the base member from the front surface of the base member to the rear surface of the base member.

The base member may define a first additional hole overlapping the first line area and defined from the rear surface of the base member with a certain depth and a second additional hole overlapping the second line area and defined from the front surface of the base member with a certain depth.

The base member may include a base layer including a front surface on which the first sensing lines are disposed and a rear surface on which the second sensing lines are disposed, a first photosensitive resin layer disposed on the front surface of the base layer and providing the front surface of the base member, and a second photosensitive resin layer disposed on the rear surface of the base layer and providing the rear surface of the base member. The rear surface may face the front surface. The front surface of the base layer may include a first line area in which the first sensing lines are disposed and a first non-line area defined between the first sensing lines, and the rear surface of the base layer includes a second line area in which the second sensing lines are disposed and a second non-line area defined between the second sensing lines.

The through-hole may include a first through-hole overlapping the first non-line area in the plan view and penetrating the first photosensitive resin layer to expose the front surface of the base layer and a second through-hole overlapping the second non-line area in the plan view and penetrating the second photosensitive resin layer to expose the rear surface of the base layer.

The base member may further define a first additional hole overlapping the first line area and defined from the front surface of the base member with a certain depth and a second additional hole overlapping the second line area and defined from the rear surface of the base member with a certain depth.

The through-hole may have a width equal to or greater than about 1 millimeter and equal to or smaller than about 5 millimeters in the second direction.

The through-hole may have a depth equal to or greater than about 10 micrometers and equal to or smaller than about 50 micrometers in a third direction. The third direction may cross the first direction and the second direction.

According to the above, the digitizer is provided with the through-hole defined by removing at least a portion thereof, and thus, a stress applied to the digitizer when the digitizer is folded is effectively reduced. Accordingly, a reliability of the digitizer is improved, and the electronic apparatus has improved folding characteristics.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1A:
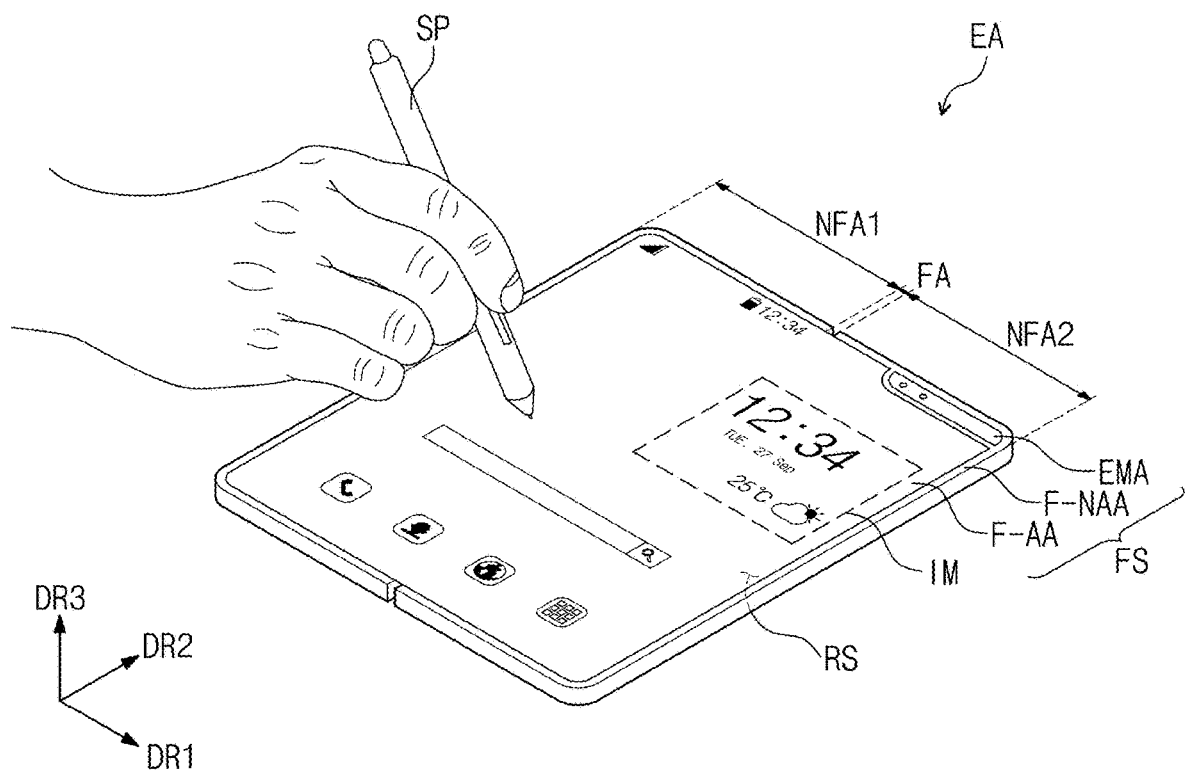
FIG. 1A is a perspective view showing an electronic apparatus according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" may include any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "may include" and/or "including", when used in this specification, specify the presence of stated features, integers, steps, operations, elements, and/or components, but do not preclude the presence or addition of one or more other features, integers, steps, operations, elements, components, and/or groups thereof. Hereinafter, the present disclosure will be explained in detail with reference to the accompanying drawings.

Figure 1B:
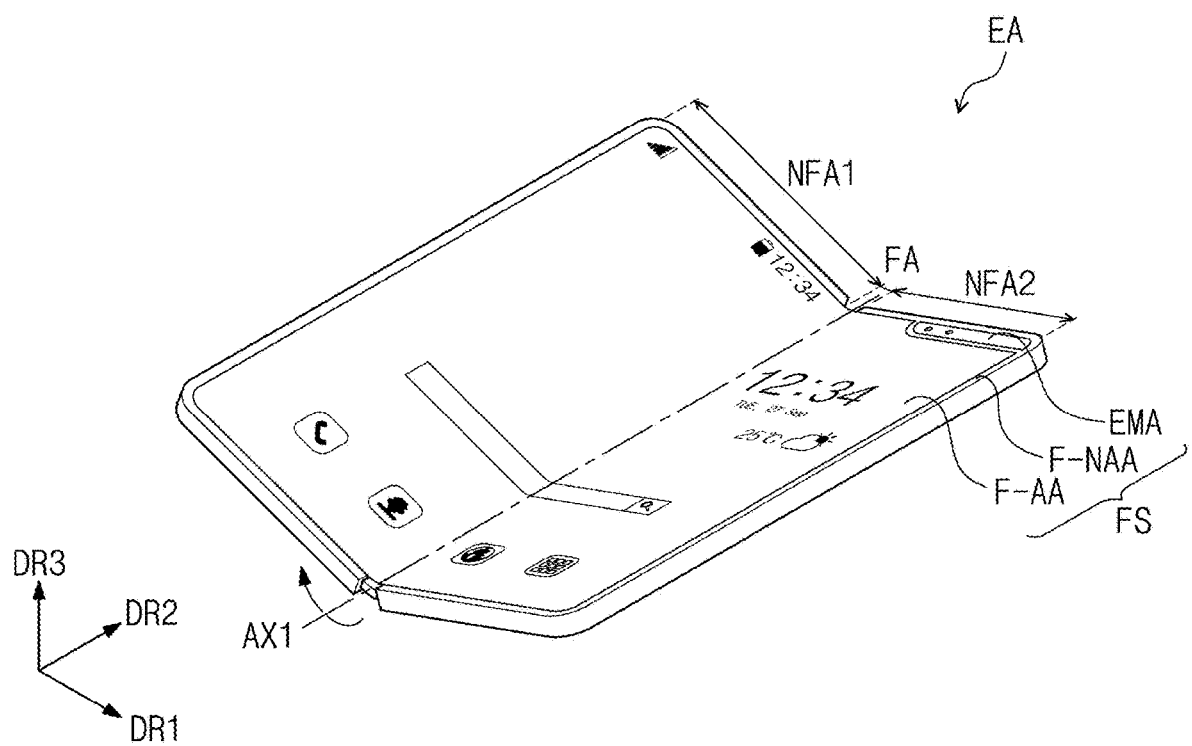
FIG. 1B is a perspective view showing an electronic apparatus according to an embodiment of the present disclosure.
Figure 1C:
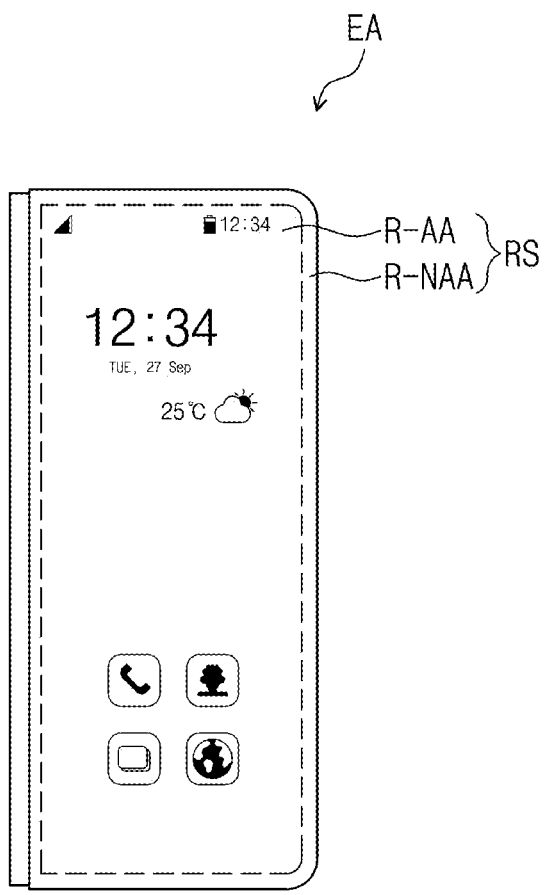
FIG. 1C is a plan view showing an electronic apparatus in a folded state according to an embodiment of the present disclosure.
Figure 1C:
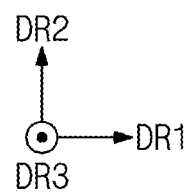
Figure 1D:
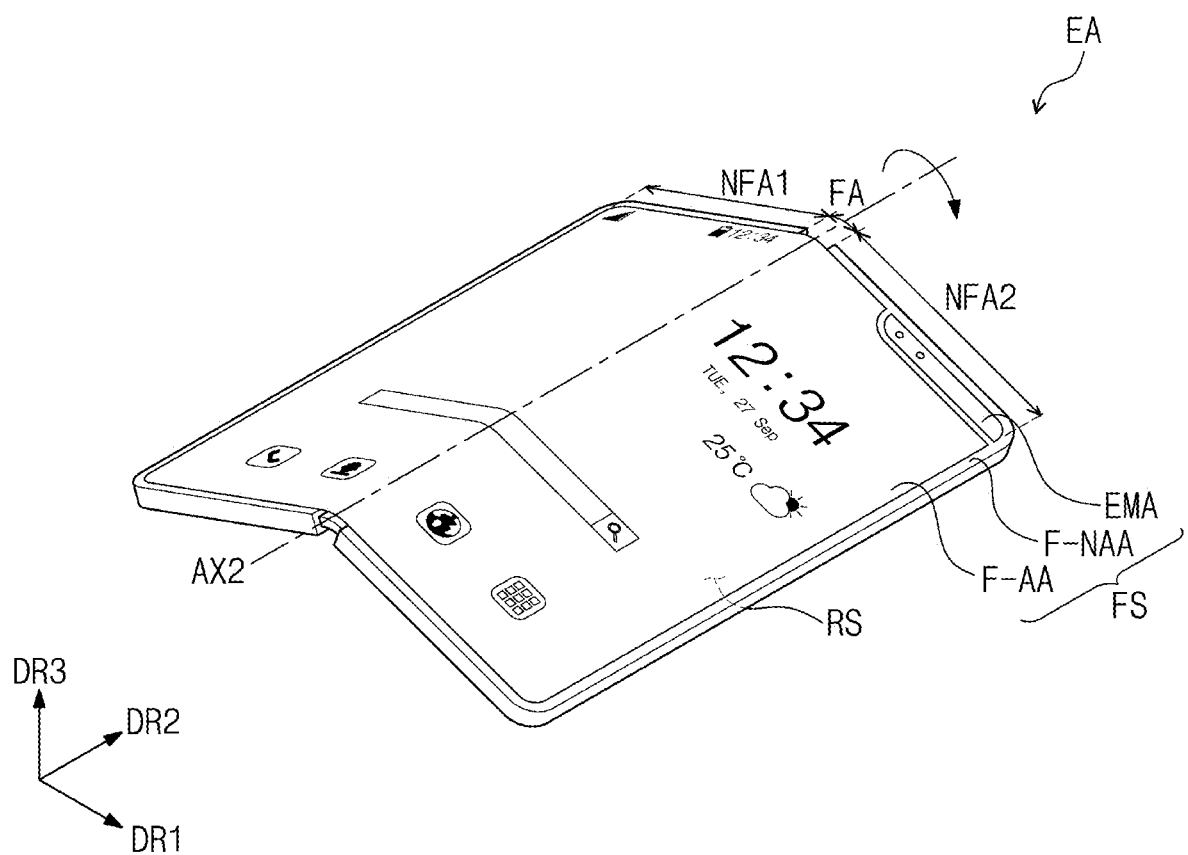
FIG. 1D is a perspective view showing an electronic apparatus according to an embodiment of the present disclosure.

FIG. 1A is a perspective view showing an electronic apparatus EA according to an embodiment of the present disclosure. FIG. 1B is a perspective view showing the electronic apparatus EA according to an embodiment of the present disclosure. FIG. 1C is a plan view showing the electronic apparatus EA in a folded state according to an embodiment of the present disclosure. FIG. 1D is a perspective view showing the electronic apparatus according to an embodiment of the present disclosure.

Referring to FIG. 1A, the electronic apparatus EA may be an apparatus activated in response to an electrical signal. The electronic apparatus EA may include various embodiments. For example, the electronic apparatus EA may include a tablet computer, a notebook computer, a computer, or a smart television. In an embodiment, a smartphone will be described as the electronic apparatus EA.

The electronic apparatus EA may include a first display surface FS that is substantially parallel to each of a first direction DR1 and a second direction DR2 in an unfolded state. The electronic apparatus EA may display an image IM through the first display surface FS toward a third direction DR3. The first display surface FS through which the image IM is displayed may correspond to a front surface of the electronic apparatus EA. The image IM may include a video and a still image. FIG. 1A shows an internet search box as an example of the image IM.

In an embodiment, front (i.e., upper) and rear (i.e., lower) surfaces of each member of the electronic apparatus EA may be defined with respect to a direction in which the image IM is displayed. The front and rear surfaces may face each other in the third direction DR3, and a normal line direction of each of the front and rear surfaces may be substantially parallel to the third direction DR3.

A distance between the front surface and the rear surface in the third direction DR3 may correspond to a thickness or a height of the electronic apparatus EA in the third direction DR3. Directions indicated by the first, second, and third directions DR1, DR2, and DR3 may be relative to each other and may be changed to other directions.

The electronic apparatus EA may sense an external input applied thereto from an outside. The external input may include various forms of inputs provided from the outside of the electronic apparatus EA.

In an embodiment, the external inputs may include a proximity input (e.g., hovering) applied when approaching close to or adjacent to the electronic apparatus EA at a predetermined distance as well as a touch input by a user's body (e.g., user's hand). In addition, the external inputs may be provided in the form of force, pressure, temperature, light, etc.

FIG. 1A shows an example of the external inputs caused by a pen SP of a user. Although not shown in figures, the pen SP may be attached to or detached from the electronic apparatus EA, and the electronic apparatus EA may provide or receive signals corresponding to the attachment and detachment of the pen SP.

The electronic apparatus EA according to an embodiment may include the first display surface FS and a second display surface RS. The first display surface FS may include a first active area F-AA, a first peripheral area F-NAA, and an electronic module area EMA. The second display surface RS may be opposite to at least a portion of the first display surface FS.

The first active area F-AA may be activated in response to the electrical signal. The image IM may be displayed through the first active area F-AA, and various external inputs may be sensed through the first active area F-AA.

The first peripheral area F-NAA may be defined adjacent to the first active area F-AA. The first peripheral area F-NAA may have a predetermined color. The first peripheral area F-NAA may surround the first active area F-AA. Accordingly, the first active area F-AA may be substantially defined by the first peripheral area F-NAA, however, this is merely exemplary. The first peripheral area F-NAA may be defined adjacent to only one side of the first active area F-AA or may be omitted.

Various electronic modules may be disposed in the electronic module area EMA. For example, the electronic module may include at least one of a camera, a speaker, an optical digitizer, and a thermal digitizer. The electronic module area EMA may sense an external subject through the display surfaces FS and RS or may provide a sound signal, such as a voice, to the outside through the display surfaces FA and RS. In addition, the electronic module may include a plurality of components, however, it should not be limited to a particular embodiment.

The electronic module area EMA may be surrounded by the first active area F-AA and the first peripheral area F-NAA. However, the location of the electronic module area EMA according to the invention should not be limited thereto or thereby. The electronic module area EMA may be defined in the first active area F-AA in another embodiment, and the electronic module area EMA should not be particularly limited.

The electronic apparatus EA according to an embodiment may include at least one folding area FA and a plurality of non-folding areas NFA1 and NFA2 extending from the folding area FA.

Referring to FIG. 1B, the electronic apparatus EA may include a first folding axis AX1 that is imaginary and extends in the second direction DR2. The first folding axis AX1 may extend in the second direction DR2 on the first display surface FS. In an embodiment, the non-folding areas NFA1 and NFA2 may extend from the folding area FA with the folding area FA interposed therebetween.

In an embodiment, a first non-folding area NFA1 may extend from one side of the folding area FA in the first direction DR1, and a second non-folding area NFA2 may extend from the other side of the folding area FA in the first direction DR1.

The electronic apparatus EA may be foldable about the first folding axis AX1 to be in an in-folding state where one area of the first display surface FS, which overlaps the first non-folding area NFA1, faces the other area of the first display surface FS, which overlaps the second non-folding area NFA2.

Referring to FIG. 1C, the second display surface RS may be viewed by a user during the in-folding state of the electronic apparatus EA. In this case, the second display surface RS may include a second active area R-AA through which the image is displayed. The second active area R-AA may be activated in response to electrical signals. The second active area R-AA may be an area through which the image is displayed and various external inputs are sensed.

A second peripheral area R-NAA may be defined adjacent to the second active area R-AA. The second peripheral area R-NAA may have a predetermined color. The second peripheral area R-NAA may surround the second active area R-AA. In addition, although not shown in figures, the second display surface RS may further include an electronic module area in which an electronic module including various components is disposed, and the second display surface RS according to the invention should not be particularly limited.

Referring to FIG. 1D, the electronic apparatus EA may include a second folding axis AX2 that is imaginary and extends in the second direction DR2. The second folding axis AX2 may extend in the second direction DR2 on the second display surface RS.

The electronic apparatus EA may be foldable about the second folding axis AX2 to be in an out-folding state where one area of the second display surface RS, which overlaps the first non-folding area NFA1, faces the other area of the second display surface RS, which overlaps the second non-folding area NFA2.

However, the electronic apparatus EA according to the invention should not be limited thereto or thereby. The electronic apparatus EA may be foldable about a plurality of folding axes such that a portion of the first display surface FS and a portion of the second display surface RS face each other, and the number of the folding axes and the number of non-folding areas according to the invention should not be particularly limited.

Figure 2A:
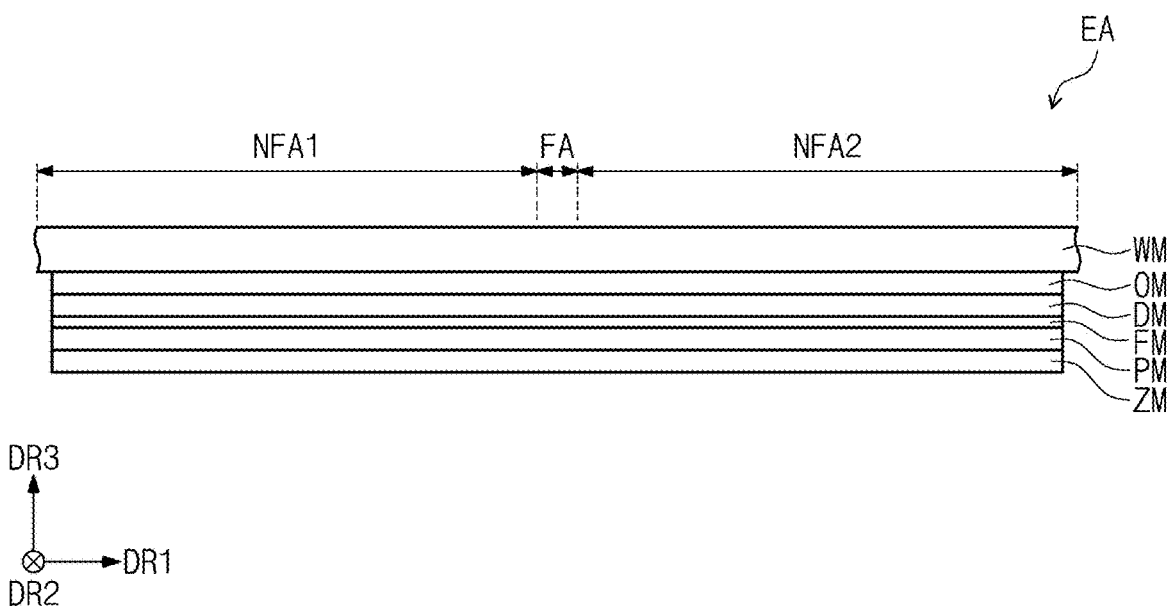
FIG. 2A is a cross-sectional view showing an electronic apparatus according to an embodiment of the present disclosure.
Figure 2B:
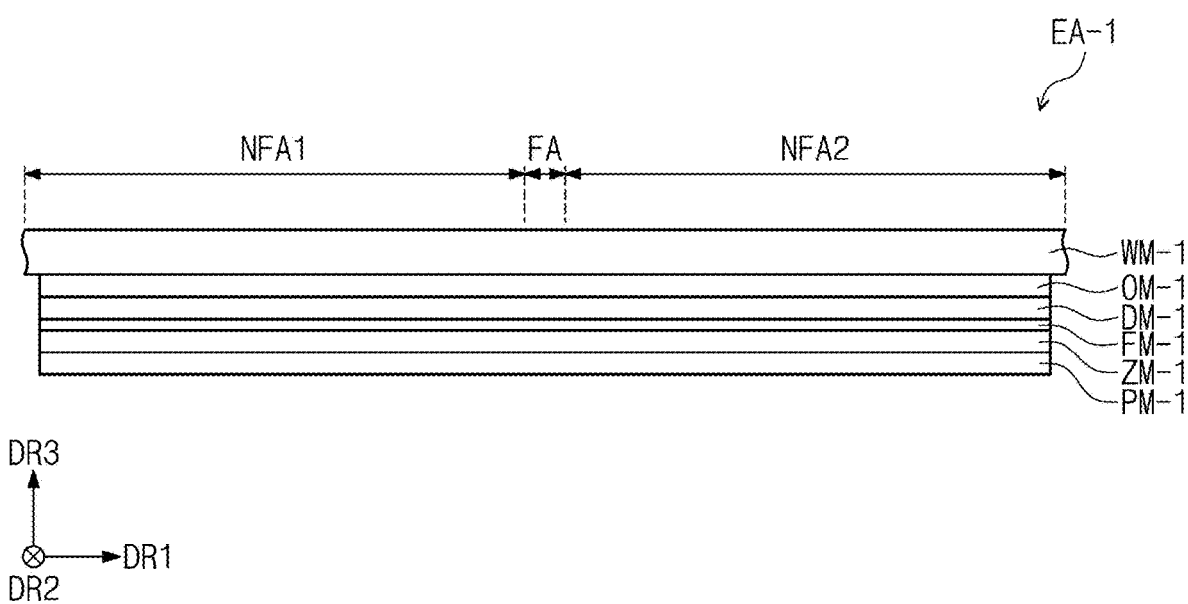
FIG. 2B is a cross-sectional view showing an electronic apparatus according to an embodiment of the present disclosure.
Figure 2C:
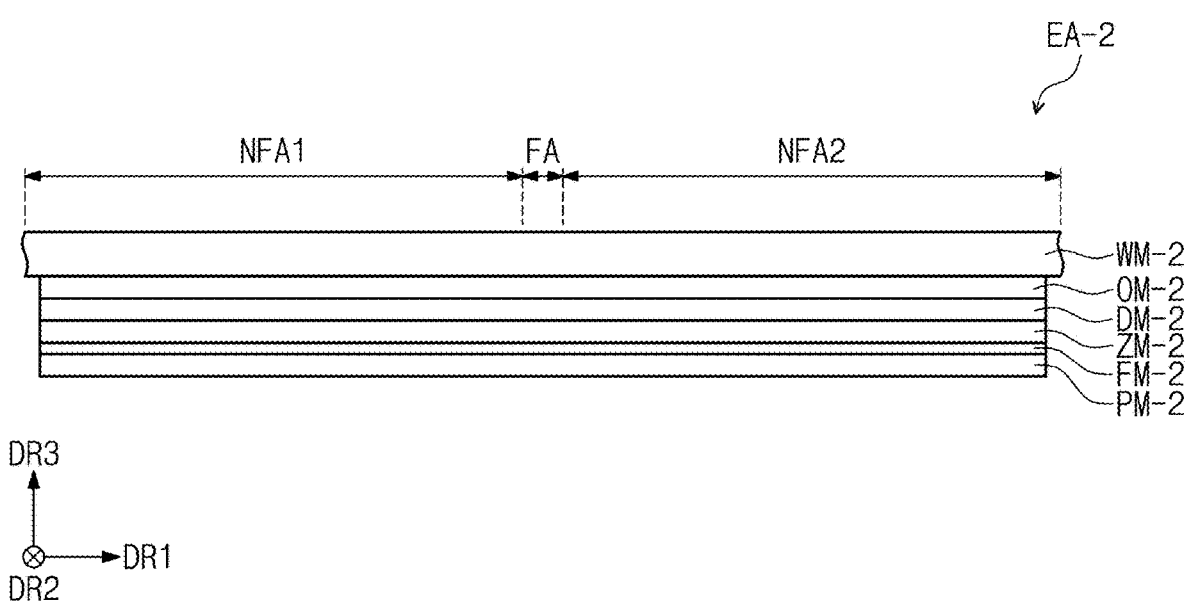
FIG. 2C is a cross-sectional view showing an electronic apparatus according to an embodiment of the present disclosure.

FIG. 2A is a cross-sectional view showing an electronic apparatus EA according to an embodiment of the present disclosure. FIG. 2B is a cross-sectional view showing an electronic apparatus EA-1 according to an embodiment of the present disclosure. FIG. 2C is a cross-sectional view showing an electronic apparatus EA-2 according to an embodiment of the present disclosure.

Referring to FIG. 2A, the electronic apparatus EA may include a window WM, an optical member OM, a display module DM, a lower film FM, a protective member PM, and a digitizer ZM.

The window WM may be disposed on the display module DM. The window WM may be coupled to a housing (not shown) to define an exterior of the electronic apparatus EA and may protect the display module DM.

The window WM may include a material having a high light transmittance. For example, the window WM may include a glass substrate, a sapphire substrate, or a plastic film. The window WM may have a single-layer or multi-layer structure.

In an embodiment, the window WM may have a stack structure of a plurality of plastic films attached to each other by an adhesive or a stack structure of the glass substrate and the plastic film attached to the glass substrate by an adhesive. Although not shown in figures, functional layers may be further disposed on the window WM to protect the window WM. For example, the functional layers may include at least one of an anti-fingerprint layer and an impact absorbing layer, however, the kinds of the functional layers according to the invention should not be particularly limited.

The optical member OM may be disposed under the window WM. The optical member OM may reduce an external light reflectance of the display module DM with respect to the light incident to the display module DM. For example, the optical member OM may include at least one of an anti-reflective film, a polarizing film, a color filter, and a gray filter.

The display module DM may serve as an output device. For example, the display module DM may display the image through the active areas F-AA and R-AA, and the user may acquire information through the image. In addition, the display module DM may serve as an input device to sense the external input applied to the active areas F-AA and R-AA.

The lower film FM may be disposed under the display module DM. The lower film FM may reduce a stress applied to the display module DM when the electronic apparatus EA is folded. In addition, the lower film FM may prevent external moisture from entering the display module DM and may absorb external impacts.

The lower film FM may include a plastic film as its base layer. The lower film FM may include a plastic film including any one selected from the group consisting of polyethersulfone ("PES"), polyacrylate, polyetherimide ("PEI"), polyethylene naphthalate ("PEN"), polyethylene terephthalate ("PET"), polyphenylene sulfide ("PPS"), polyarylate, polyimide ("PI"), polycarbonate ("PC"), poly(arylene ether sulfone), and combinations thereof.

The material for the lower film FM according to the invention should not be limited to plastic resins and may include an organic-inorganic composite material in another embodiment. The lower film FM may include a porous organic layer and an inorganic material filled in pores of the organic layer.

The lower film FM may further include a functional layer formed on the plastic film. The functional layer may include a resin layer. The functional layer may be formed by a coating method.

The protective member PM may be disposed under the display module DM. The protective member PM may include at least one functional layer that protects the display module DM. For example, the protective member PM may include a light shielding layer, a heat dissipating layer, a cushion layer, and a plurality of adhesive layers.

The light shielding layer may improve a phenomenon in which components disposed in the display module DM are viewed through the window WM through the active areas F-AA and R-AA. Although not shown in figures, the light shielding layer may include a binder and a plurality of pigment particles dispersed in the binder. The pigment particles may include a carbon black. As the electronic apparatus EA according to the embodiment includes the protective member PM including the light shielding layer, a light shielding effect may be improved.

The heat dissipating layer may effectively dissipate heat generated by the display module DM. The heat dissipating layer may include at least one of graphite, copper (Cu), and aluminum (Al) having superior heat dissipation characteristics, however, the material included in the heat dissipating layer according to the invention should not be limited thereto or thereby. The heat dissipating layer may improve the heat dissipation characteristics and may have electromagnetic wave shielding characteristics or electromagnetic wave absorption characteristics.

The cushion layer may be a synthetic resin foam. The cushion layer may include a matrix and a plurality of pores. The cushion layer may have an elasticity and may have a porous structure.

The matrix may include a flexible material. The matrix may include a synthetic resin. For example, the matrix may include at least one of acrylonitrile butadiene styrene copolymer ("ABS"), polyurethane ("PU"), polyethylene ("PE"), ethylene vinyl acetate ("EVA"), and polyvinyl chloride ("PVC").

The pores may absorb impacts applied to the cushion layer. The pores may be defined by the porous structure of the cushion layer.

However, the present disclosure should not be limited thereto or thereby. At least one of the light shielding layer, the heat dissipating layer, and the cushion layer may be omitted and the plural layers may be provided in a single-layer structure in another embodiment, and they should not be particularly limited.

The digitizer ZM may be disposed under the display module DM. The digitizer ZM may sense the signal transmitted by the pen SP (refer to FIG. 1A) among the external inputs. The digitizer ZM may sense the external inputs by an electromagnetic resonance ("EMR") method. According to the EMR method, a resonant circuit provided in the pen SP generates a magnetic field, the vibrating electric field induces signals to a plurality of coils included in the digitizer ZM, and a position of the pen SP is detected based on the signals induced to the coils. The digitizer ZM will be described in detail later.

In the present embodiment, the digitizer ZM, the protective member PM, the lower film FM, the display module DM, and the optical member OM may be sequentially arranged in the third direction DR3 in the electronic apparatus EA.

Although not shown in figures, the components included in the electronic apparatus EA may be coupled to each other by adhesive layers disposed between the components. Hereinafter, the adhesive layers may be an optically clear adhesive ("OCA") film, an optically clear resin ("OCR"), or a pressure sensitive adhesive ("PSA") film. In addition, the adhesive layers may include a light-curable adhesive material or a heat-curable adhesive material, however, the material included in the adhesive layers according to the invention should not be particularly limited.

Referring to FIG. 2B, the electronic apparatus EA-1 may include a window WM-1, an optical member OM-1, a display module DM-1, a lower film FM-1, a digitizer ZM-1, and a protective member PM-1. Components included in the electronic apparatus EA-1 shown in FIG. 2B may be substantially the same as the components included in the electronic apparatus EA described with reference to FIG. 2A, and only differences according to the stacking order will be described.

In the present embodiment, the protective member PM-1, the digitizer ZM-1, the lower film FM-1, the display module DM-1, the optical member OM-1, and the window WM-1 of the electronic apparatus EA-1 may be sequentially arranged in the third direction DR3.

Referring to FIG. 2C, the electronic apparatus EA-2 may include a window WM-2, an optical member OM-2, a display module DM-2, a digitizer ZM-2, a lower film FM-2, and a protective member PM-2. Components included in the electronic apparatus EA-2 shown in FIG. 2C may be substantially the same as the components included in the electronic apparatus EA described with reference to FIG. 2A, and only differences according to the stacking order will be described.

In the present embodiment, the protective member PM-2, the lower film FM-2, the digitizer ZM-2, the display module DM-2, the optical member OM-2, and the window WM-2 of the electronic apparatus EA-2 may be sequentially arranged in the third direction DR3.

Figure 3A:
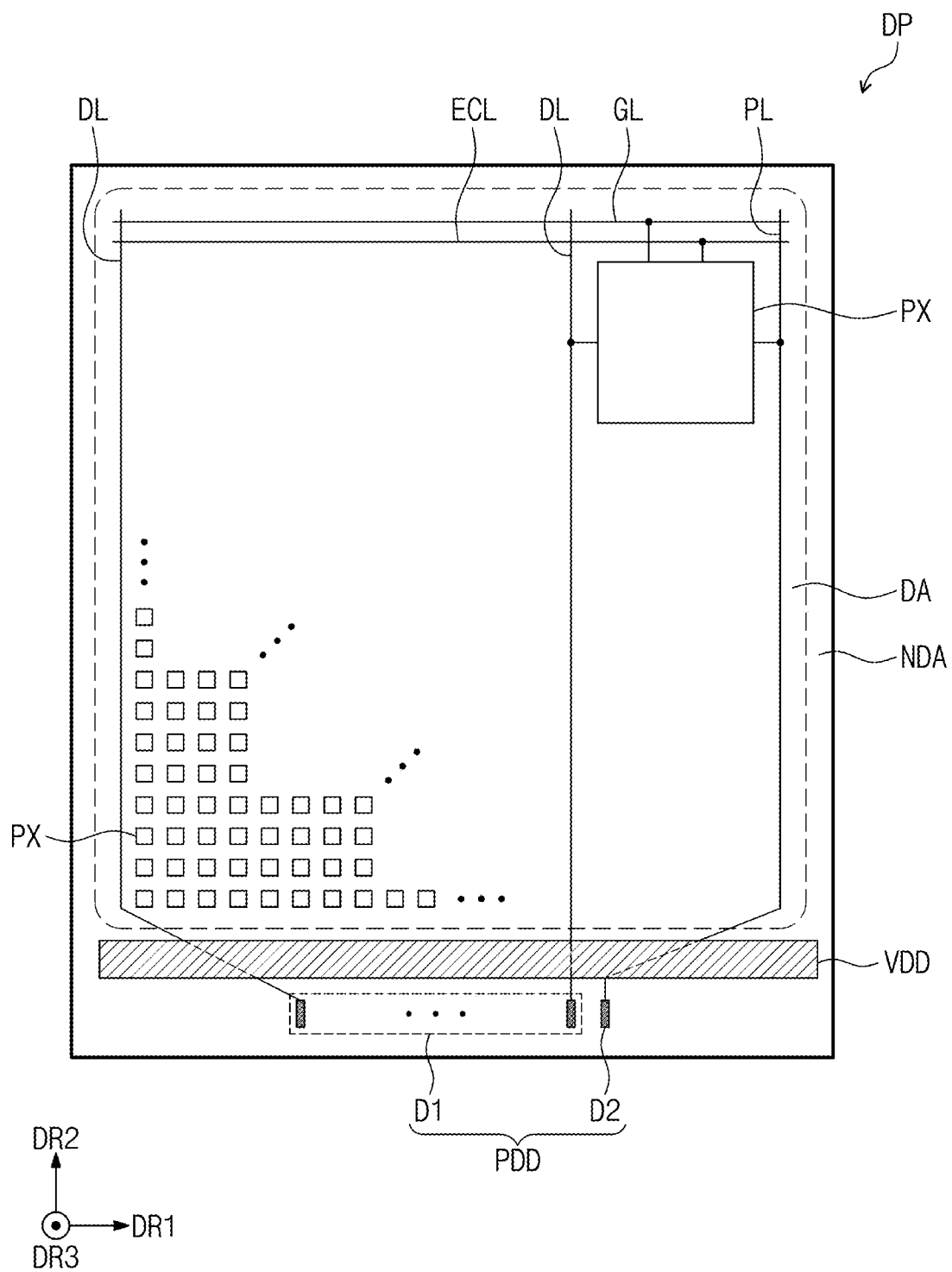
FIG. 3A is a plan view showing a display panel according to an embodiment of the present disclosure.
Figure 3B:
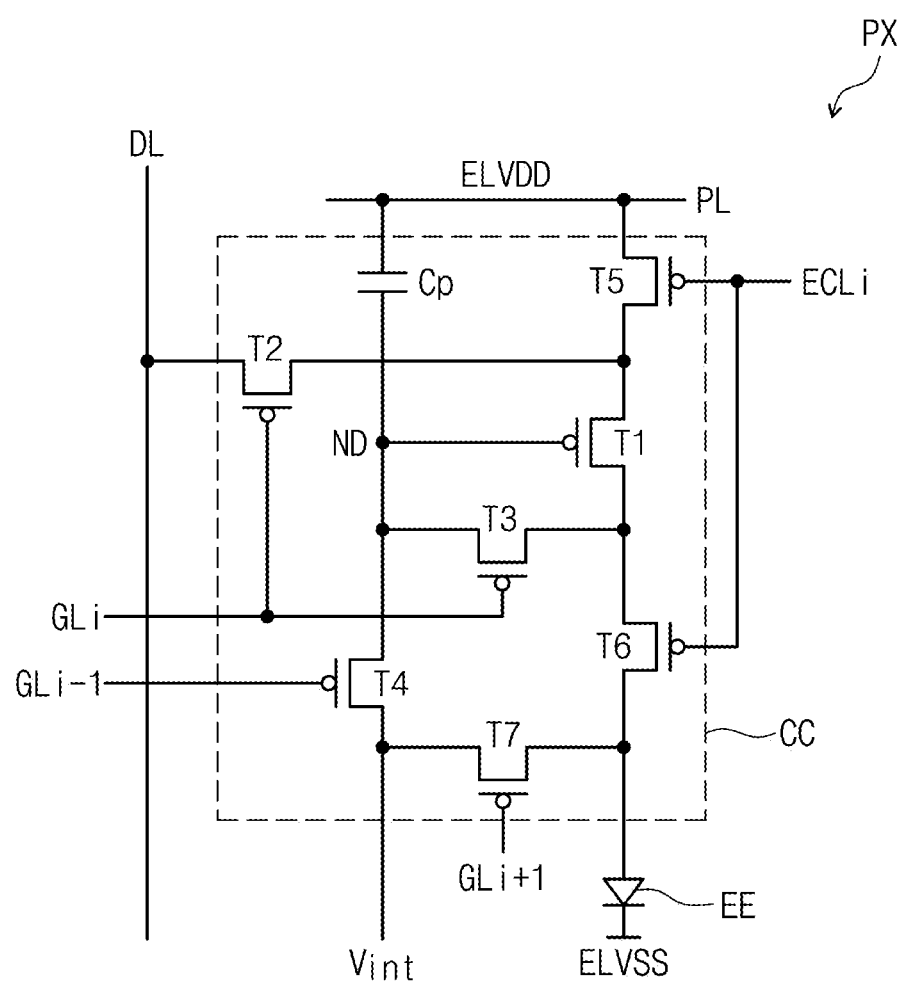
FIG. 3B is an equivalent circuit diagram showing a pixel according to an embodiment of the present disclosure.
Figure 4:
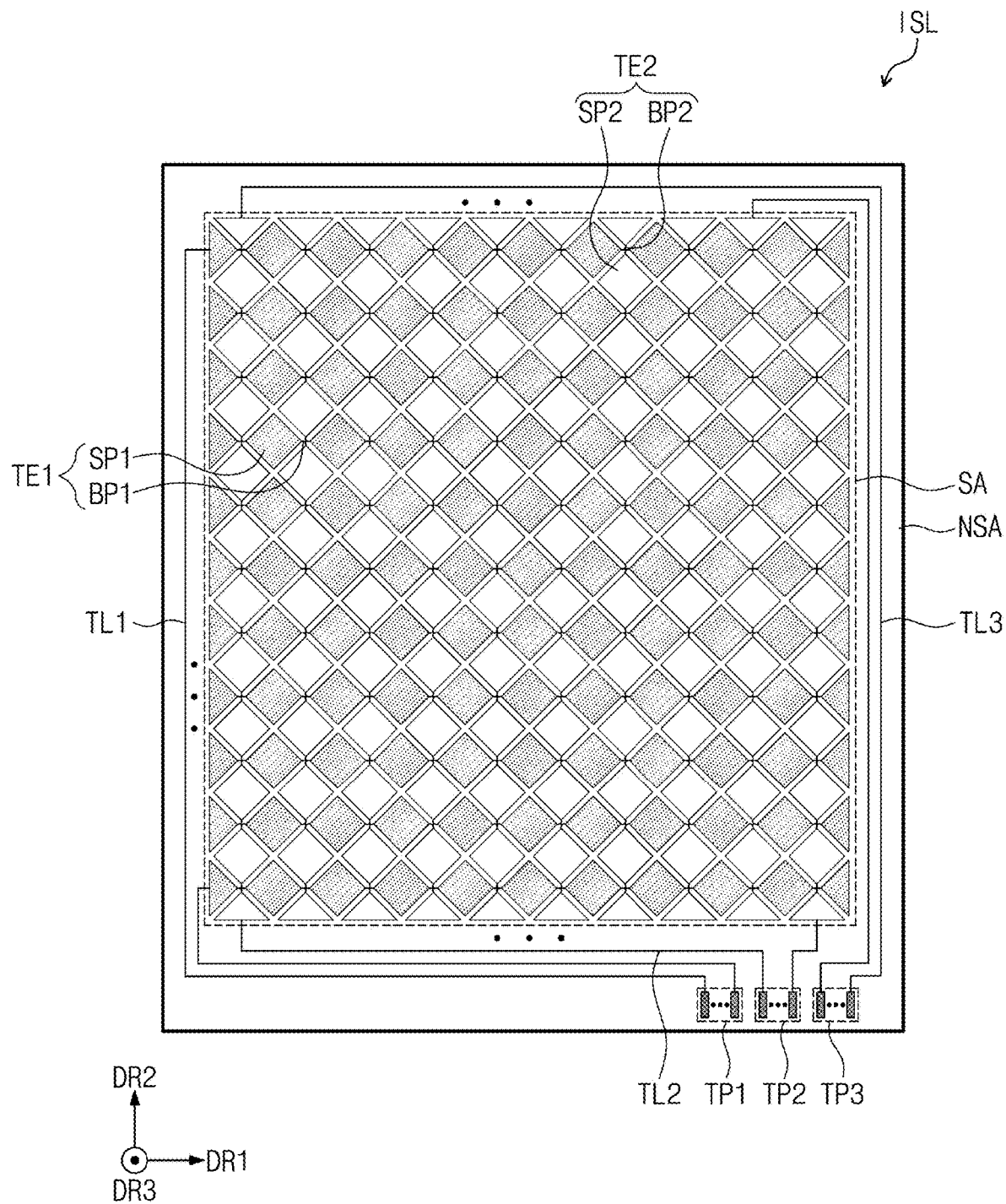
FIG. 4 is a plan view showing a digitizer according to an embodiment of the present disclosure.

FIG. 3A is a plan view showing a display panel DP according to an embodiment of the present disclosure. FIG. 3B is an equivalent circuit diagram showing a pixel PX according to an embodiment of the present disclosure. FIG. 4 is a plan view showing a digitizer according to an embodiment of the present disclosure. In FIGS. 3A, 3B, and 4, the same reference numerals denote the same elements in FIGS. 1A to 1D and 2A to 2C, and thus, detailed descriptions of the same elements will be omitted. The display module DM, DM-1 and DM-2 described with reference to FIGS. 2A to 2C may include a display panel DP and an input sensing panel ISL.

Referring to FIG. 3A, the display panel DP may include a plurality of pixels PX, a plurality of signal lines GL, DL, PL, and ECL, and a plurality of display pads PDD.

The display panel DP may include a display area DA through which the image is displayed and a non-display area NDA in which a driving circuit or a driving line is disposed. The display area DA may overlap at least a portion of the active areas F-AA and R-AA of the electronic apparatus EA. In addition, the non-display area NDA may overlap the peripheral areas F-NAA and R-NAA of the electronic apparatus EA in a plan view.

The signal lines GL, DL, PL, and ECL may be connected to the pixels PX to apply electrical signals to the pixels PX. Among the signal lines included in the display panel DP, a scan line GL, a data line DL, a power line PL, and a light emitting control line ECL are shown as a representative example, however, this is merely exemplary. The signal lines GL, DL, PL, and ECL may further include an initialization voltage line, and the signal lines GL, DL, PL, and ECL should not be particularly limited.

The pixels PX may be arranged in the first direction DR1 and the second direction DR2 and may be spaced apart from each other to form a matrix configuration in a plan view.

FIG. 3B shows an embodiment of a signal circuit diagram of one pixel PX among the pixels PX. FIG. 3B shows the pixel PX connected to an i-th scan line GLi and an i-th light emitting control line ECLi.

The pixel PX may include a light emitting element EE and a pixel circuit CC. The pixel circuit CC may include a plurality of transistors T1 to T7 and a capacitor CP. The transistors T1 to T7 may be formed through a low temperature polycrystalline silicon ("LTPS") process or a low temperature polycrystalline oxide ("LTPO") process.

The pixel circuit CC may control an amount of current flowing through the light emitting element EE in response to a data signal. The light emitting element EE may emit a light at a predetermined luminance in response to the amount of the current provided from the pixel circuit CC. To this end, a first power voltage ELVDD has a voltage level set higher than a voltage level of a second power voltage ELVSS. The light emitting element EE may include an organic light emitting element or a quantum dot light emitting element.

Each of the transistors T1 to T7 may include an input electrode (or source electrode), an output electrode (or drain electrode), and a control electrode (or gate electrode). In the present disclosure, for the convenience of explanation, one electrode of the input electrode and the output electrode may be referred to as a "first electrode", and the other electrode of the input electrode and the output electrode may be referred to as a "second electrode".

A first electrode of the first transistor T1 is connected to the first power voltage ELVDD via a fifth transistor T5, and a second electrode of the first transistor T1 is connected to an anode electrode of the light emitting element EE via a sixth transistor T6. The first transistor T1 may be referred to as a "driving transistor" in the present disclosure.

The first transistor T1 controls the amount of the current flowing through the light emitting element EE in response to a voltage applied to a control electrode of the first transistor T1.

The second transistor T2 is connected between the data line DL and the first electrode of the first transistor T1. A control electrode of the second transistor T2 is connected to the i-th scan line GLi. When an i-th scan signal is applied to the i-th scan line GLi, the second transistor T2 is turned on to electrically connect the data line DL to the first electrode of the first transistor T1.

The third transistor T3 is connected between the second electrode of the first transistor T1 and the control electrode of the first transistor T1. A control electrode of the third transistor T3 is connected to the i-th scan line GLi. When the i-th scan signal is applied to the i-th scan line GLi, the third transistor T3 is turned on to electrically connect the second electrode of the first transistor T1 to the control electrode of the first transistor T1. Accordingly, when the third transistor T3 is turned on, the first transistor T1 is connected in a diode configuration.

A fourth transistor T4 is connected between a node ND and an initialization power generator (not shown). A control electrode of the fourth transistor T4 is connected to an (i−1)th scan line GLi−1. When an (i−1)th scan signal is applied to the (i−1)th scan line GLi−1, the fourth transistor T4 is turned on to apply an initialization voltage Vint to the node ND.

A fifth transistor T5 is connected between the power line PL and the first electrode of the first transistor T1. A control electrode of the fifth transistor T5 is connected to the i-th light emitting control line ECLi.

A sixth transistor T6 is connected between the second electrode of the first transistor T1 and the anode electrode of the light emitting element EE. A control electrode of the sixth transistor T6 is connected to the i-th light emitting control line ECLi.

A seventh transistor T7 is connected between the initialization power generator (not shown) and the anode electrode of the light emitting element EE. A control electrode of the seventh transistor T7 is connected to an (i+1)th scan line GLi+1. When an (i+1)th scan signal is applied to the (i+1)th scan line GLi+1, the seventh transistor T7 is turned on to apply the initialization voltage Vint to the anode electrode of the light emitting element EE.

The seventh transistor T7 may improve a black expression capability of the pixel PX. In detail, when the seventh transistor T7 is turned on, a parasitic capacitor (not shown) of the light emitting element EE is discharged. Then, the light emitting element EE may not emit the light due to a leakage current from the first transistor T1 when black luminance is displayed, and thus, the black expression capability may be improved.

Additionally, the control electrode of the seventh transistor T7 is connected to the (i+1)th scan line GLi+1 in FIG. 3B, however, the present disclosure should not be limited thereto or thereby. According to another embodiment of the present disclosure, the control electrode of the seventh transistor T7 may be connected to the i-th scan line GLi or the (i−1)th scan line GLi−1.

The capacitor CP is connected between the power line PL and the node ND. The capacitor CP is charged with a voltage corresponding to the data signal. When the fifth transistor T5 and the sixth transistor T6 are turned on by the voltage charged in the capacitor CP, the amount of the current flowing through the first transistor T1 may be determined.

In the present disclosure, an equivalent circuit of the pixel PX according to the invention should not be limited to the equivalent circuit shown in FIG. 3B. According to another embodiment, the pixel PX may be implemented in various ways to allow the light emitting element EE to emit the light. FIG. 3B shows a PMOS as a reference of the pixel circuit CC, however, it should not be limited thereto or thereby. According to another embodiment, the pixel circuit CC may be implemented by an NMOS. According to another embodiment, the pixel circuit CC may be implemented by a combination of the NMOS and the PMOS.

Referring to FIG. 3A again, a power pattern VDD may be disposed in the non-display area NDA. In an embodiment, the power pattern VDD may be connected to the power lines PL. Accordingly, the display panel DP may include the power pattern VDD, and thus, the pixels PX may receive the same first power supply signal.

The display pads PDD may include a first pad D1 and a second pad D2. The first pad D1 may be provided in plural number, and the first pads D1 may be connected to the data lines DL, respectively. The second pad D2 may be connected to the power pattern VDD to be electrically connected to the power line PL. The display panel DP may apply the electrical signals, which are provided from the outside through the display pads PDD, to the pixels PX. The display pads PDD may further include pads to receive other electrical signals in addition to the first and second pads D1 and D2, and the display pads PDD according to the invention should not be limited to a particular embodiment.

Referring to FIG. 4, the input sensing panel ISL may be disposed on the display panel DP. The input sensing panel ISL may be formed directly on the display panel DP through successive processes, and the input sensing panel ISL according to the invention should not be particularly limited. As another way, the input sensing panel ISL may be coupled to the display panel DP by a separate adhesive layer.

The input sensing panel ISL may include a first sensing electrode TE1, a second sensing electrode TE2, a plurality of trace lines TL1, TL2, and TL3, and a plurality of sensing pads TP1, TP2, and TP3. The input sensing panel ISL may include a sensing area SA and a non-sensing area NSA. The non-sensing area NSA may surround the sensing area SA. The sensing area SA may be a sensing area in which the input provided from the outside is sensed. The sensing area SA may overlap the display area DA of the display panel DP in a plan view.

The input sensing panel ISL may sense the external input using a self-capacitance method or a mutual capacitance method. The first sensing electrode TE1 and the second sensing electrode TE2 may be variously modified, arranged, and connected according to the self-capacitance method or the mutual capacitance method.

The first sensing electrode TE1 may include first sensing patterns SP1 and first bridge patterns BP1. The first sensing electrode TE1 may extend in the first direction DR1 and may be arranged in the second direction DR2. The first sensing patterns SP1 may be arranged to be spaced apart from each other in the first direction DR1. At least one first bridge pattern BP1 may be disposed between two first sensing patterns SP1 adjacent to each other.

The second sensing electrode TE2 may include second sensing patterns SP2 and second bridge patterns BP2. The second sensing electrode TE2 may extend in the second direction DR2 and may be arranged in the first direction DR1. The second sensing patterns SP2 may be arranged to be spaced apart from each other in the second direction DR2. At least one second bridge pattern BP2 may be disposed between two second sensing patterns SP2 adjacent to each other.

The trace lines TL1, TL2, and TL3 may be arranged in the non-sensing area NSA. The trace lines TL1, TL2, and TL3 may include a first trace line TL1, a second trace line TL2, and a third trace line TL3.

The first trace line TL1 may be connected to one end of the first sensing electrode TEL The second trace line TL2 may be connected to one end of the second sensing electrode TE2. The third trace line TL3 may be connected to the other end of the second sensing electrode TE2. The other end of the second sensing electrode TE2 may be opposite to the one end of the second sensing electrode TE2.

According to the present disclosure, the second sensing electrode TE2 may be connected to the second trace line TL2 and the third trace line TL3. Accordingly, a sensitivity with respect to areas of the second sensing electrode TE2 having a relatively longer length than that of the first sensing electrode TE1 may be uniformly maintained, however, this is merely exemplary. The third trace line TL3 may be omitted, and the third trace line TL3 according to the invention should not be particularly limited.

The sensing pads TP1, TP2, and TP3 may be arranged in the non-sensing area NSA. The sensing pads TP1, TP2, and TP3 may include a first sensing pad TP1, a second sensing pad TP2, and a third sensing pad TP3. The first sensing pad TP1 may be connected to the first trace line TL1, and thus, may be electrically connected to the first sensing electrode TEL The second sensing pad TP2 may be connected to the second trace line TL2, and the third sensing pad TP3 may be connected to the third trace line TL3. Therefore, the second sensing pad TP2 and the third sensing pad TP3 may be electrically connected to the second sensing electrode TE2.

Figure 5:
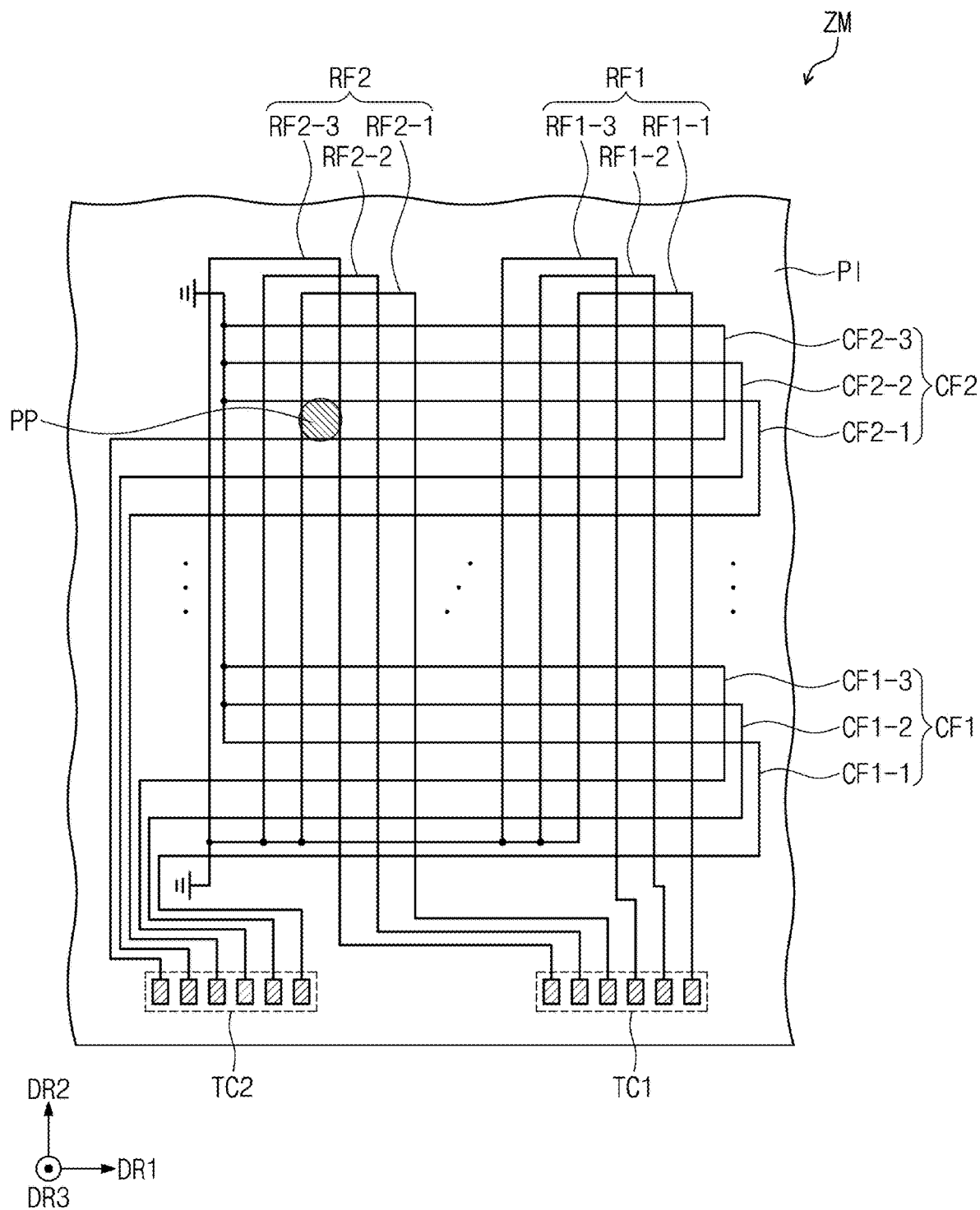
FIG. 5 is a plan view showing a digitizer according to an embodiment of the present disclosure.
Figure 6:
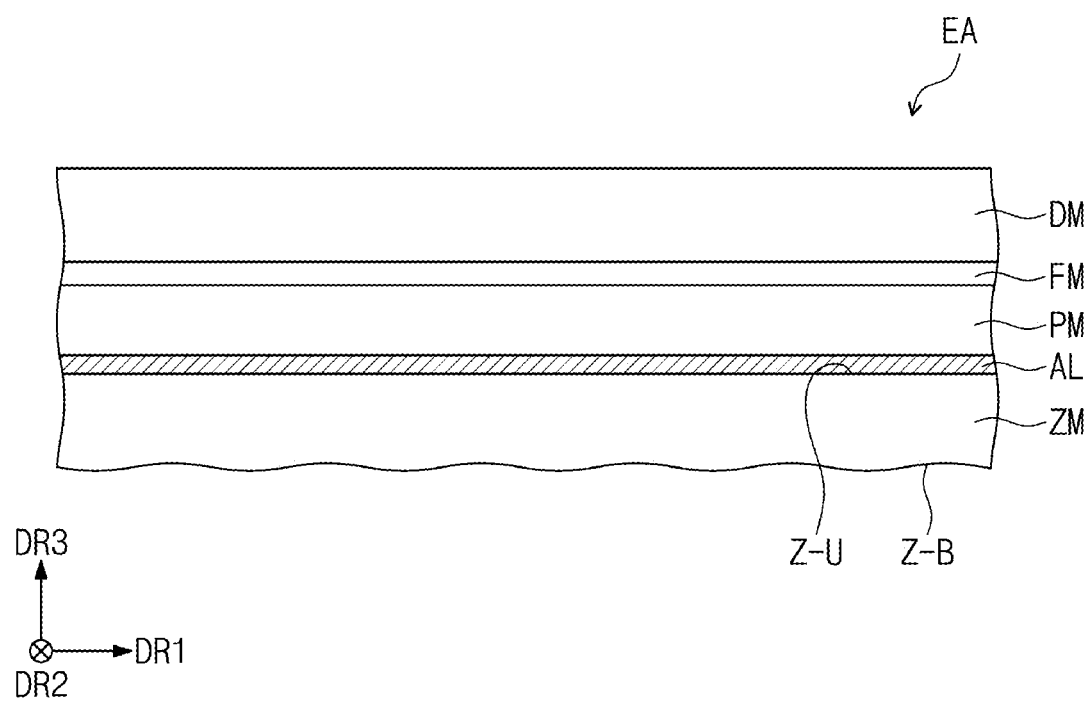
FIG. 6 is a cross-sectional view showing a portion of an electronic apparatus according to an embodiment of the present disclosure.

FIG. 5 is a plan view showing a digitizer ZM according to an embodiment of the present disclosure, and FIG. 6 is a cross-sectional view showing a portion of the electronic apparatus according to an embodiment of the present disclosure. In FIGS. 5 and 6, the same reference numerals denote the same elements in FIGS. 1A to 1D, 2A to 2C, 3A, 3B, and 4, and thus, detailed descriptions of the same element will be omitted. The digitizer ZM according to the embodiment of the present disclosure may sense the external input by an electromagnetic resonance (EMR) method.

Referring to FIG. 5, the digitizer ZM may include a base member PI, digitizer sensors RF1, RF2, CF1, and CF2, and a plurality of digitizer pads TC1 and TC2.

The base member PI may be a base layer on which the digitizer sensors RF1, RF2, CF1, and CF2 are disposed. The base member PI may include an organic material. For example, the base member PI may include polyimide (PI).

The first digitizer sensor RF1 may include a plurality of first sensing lines RF1-1, RF1-2, and RF1-3, the first digitizer sensor RF2 may include a plurality of first sensing lines RF2-1, RF2-2, and RF2-3, the second digitizer sensor CF1 may include a plurality of second sensing lines CF1-1, CF1-2, and CF1-3, and the second digitizer sensor CF2 may include a plurality of second sensing lines CF2-1, CF2-2, and CF2-3.

The first sensing lines RF1-1, RF1-2, RF1-3, RF2-1, RF2-2, and RF2-3 may extend in the second direction DR2. The first sensing lines RF1-1, RF1-2, RF1-3, RF2-1, RF2-2, and RF2-3 may be arranged in the first direction DR1 to be spaced apart from each other. The direction in which the first sensing lines RF1-1, RF1-2, RF1-3, RF2-1, RF2-2, and RF2-3 extend may be substantially the same as the direction of the folding axes AX1 and AX2 described with reference to FIGS. 1B and 1C.

The second sensing lines CF1-1, CF1-2, CF1-3, CF2-1, CF2-2, and CF2-3 may extend in the first direction DR1. The second sensing lines CF1-1, CF1-2, CF1-3, CF2-1, CF2-2, and CF2-3 may be arranged in the second direction DR2 to be spaced apart from each other.

The first digitizer sensors RF1 and RF2 may correspond to input coils of the digitizer ZM of the EMR method, and the second digitizer sensors CF1 and CF2 may correspond to output coils of the digitizer ZM of the EMR method.

The first sensing lines RF1-1, RF1-2, RF1-3, RF2-1, RF2-2, and RF2-3 and the second sensing lines CF1-1, CF1-2, CF1-3, CF2-1, CF2-2, and CF2-3 may be arranged in the base member PI to be insulated from each other. Each of the first sensing lines RF1-1, RF1-2, RF1-3, RF2-1, RF2-2, and RF2-3 may be connected to corresponding first digitizer pad TC1, and each of the second sensing lines CF1-1, CF1-2, CF1-3, CF2-1, CF2-2, and CF2-3 may be connected to corresponding second digitizer pad TC2.

The first sensing lines RF1-1, RF1-2, RF1-3, RF2-1, RF2-2, and RF2-3 may receive scan signals that are activated in different periods from each other. Each of the first sensing lines RF1-1, RF1-2, RF1-3, RF2-1, RF2-2, and RF2-3 may generate a magnetic field in response to a corresponding scan signal.

When the pen SP (refer to FIG. 1A) approaches the first sensing lines RF1-1, RF1-2, RF1-3, RF2-1, RF2-2, and RF2-3, the magnetic field induced by the first sensing lines RF1-1, RF1-2, RF1-3, RF2-1, RF2-2, and RF2-3 may resonate with the resonant circuit of the pen SP. The pen SP may generate a resonant frequency. In an embodiment, the pen SP may include an LC resonant circuit including an inductor and a capacitor.

The second sensing lines CF1-1, CF1-2, CF1-3, CF2-1, CF2-2, and CF2-3 may output the sensing signals in accordance with the resonant frequency of the pen SP to the second digitizer pads TC2.

In the following descriptions, a center portion of an area where a second coil RF2-2 among the first sensing lines RF1-1, RF1-2, RF1-3, RF2-1, RF2-2, and RF2-3 which crosses a second coil CF2-2 among the second sensing lines CF1-1, CF1-2, CF1-3, CF2-1, CF2-2, and CF2-3 is assumed as an input point PP.

In this example, the sensing signal output from the second coil RF2-2 among the first sensing lines RF1-1, RF1-2, RF1-3, RF2-1, RF2-2, and RF2-3 may have a level higher than the sensing signals output from the other first sensing lines RF1-1, RF1-2, RF1-3, RF2-1, and RF2-3.

In this example, the sensing signal output from the second coil CF2-2 among the second sensing lines CF1-1, CF1-2, CF1-3, CF2-1, CF2-2, and CF2-3 may have a level higher than the sensing signals output from the other second sensing lines CF1-1, CF1-2, CF1-3, CF2-1, and CF2-3.

In this example, the sensing signals output from a first coil CF2-1 and a third coil CF2-3 among the second sensing lines CF1-1, CF1-2, CF1-3, CF2-1, CF2-2, and CF2-3 may have a level lower than that of the sensing signal output from the second coil CF2-2, and the sensing signals output from the first coil CF2-1 and the third coil CF2-3 among the second sensing lines CF1-1, CF1-2, CF1-3, CF2-1, CF2-2, and CF2-3 may have a level higher than that of the sensing signals output from the other second sensing lines CF1-1, CF1-2, and CF1-3.

In this example, two-dimensional coordinate information of the input point PP by the pen SP may be calculated based on a time when the sensing signal output from the second coil CF2-2 and having the high level is detected and a relative position of the second coil CF2-2 with respect to the second sensing lines CF1-1, CF1-2, CF1-3, CF2-1, and CF2-3.

In the present disclosure, some of the sensing lines RF1-1, RF1-2, RF1-3, RF2-1, RF2-3, CF1-1, CF1-2, CF1-3, CF2-1, and CF2-3 may be partially omitted in an area overlapping the folding area FA and may be spaced apart from the folding area FA in a plan view.

Referring to FIG. 6, the digitizer ZM according to an embodiment may include a front surface Z-U and a rear surface Z-B. The front surface Z-U may be disposed to be more adjacent to the display module DM than the rear surface Z-B is. In the present embodiment, the front surface Z-U may be relatively flat compared with the rear surface Z-B. That is, the front surface Z-U may be flatter than the rear surface Z-B. The front surface Z-U and the rear surface Z-B may have different surface roughness from each other.

The front surface Z-U that is relatively flat may be attached to a lower portion of the protective member PM by the adhesive AL. According to the present disclosure, as the front surface Z-U that is relatively flat compared with the rear surface Z-B is disposed adjacent to the display module DM, a defect in which an irregular surface is viewed to the user due to the light passing though the display module DM may be effectively prevented. Accordingly, the visibility of the electronic apparatus EA may be improved.

Figure 7A:
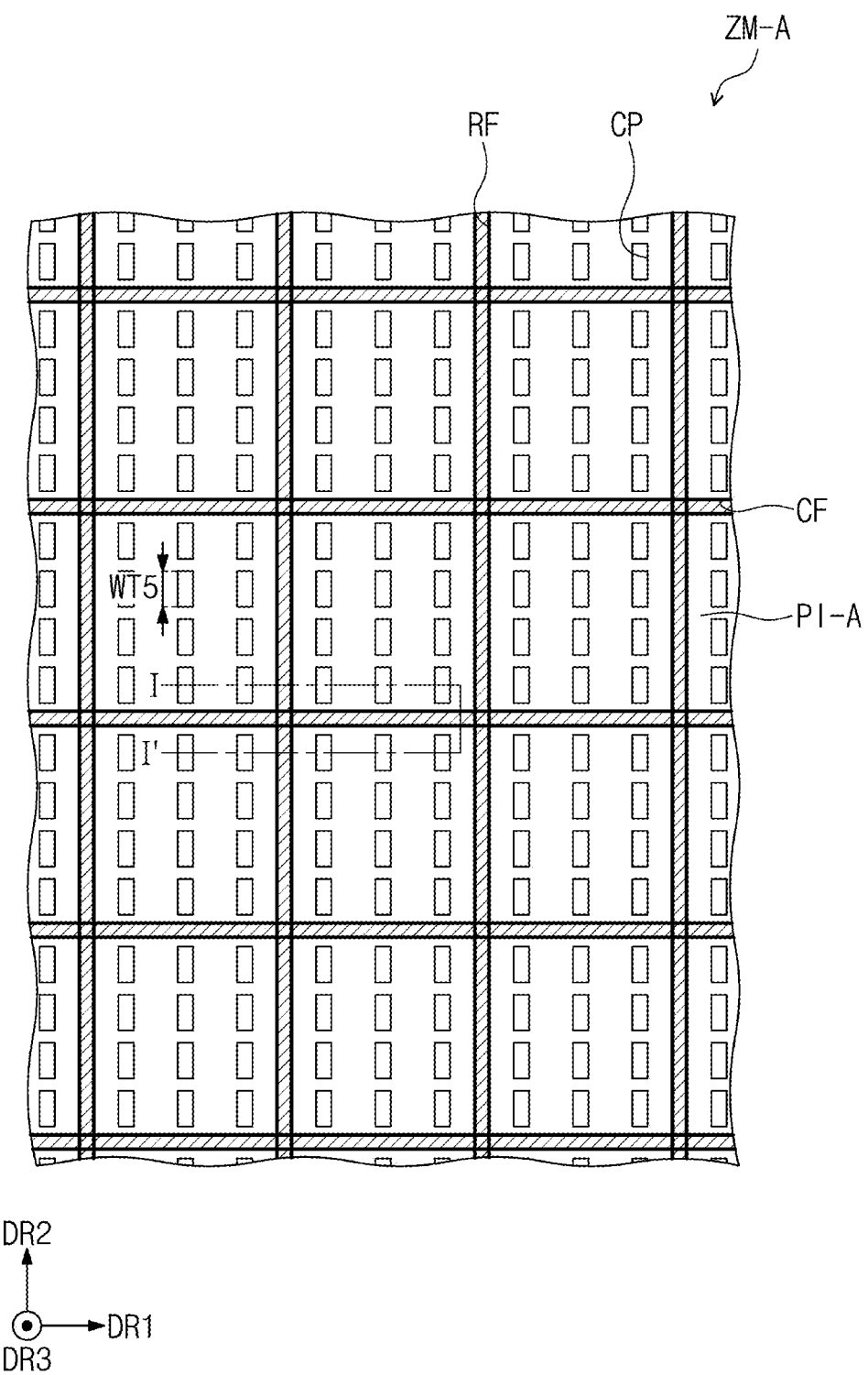
FIG. 7A is a plan view showing a digitizer according to an embodiment of the present disclosure.
Figure 7B:
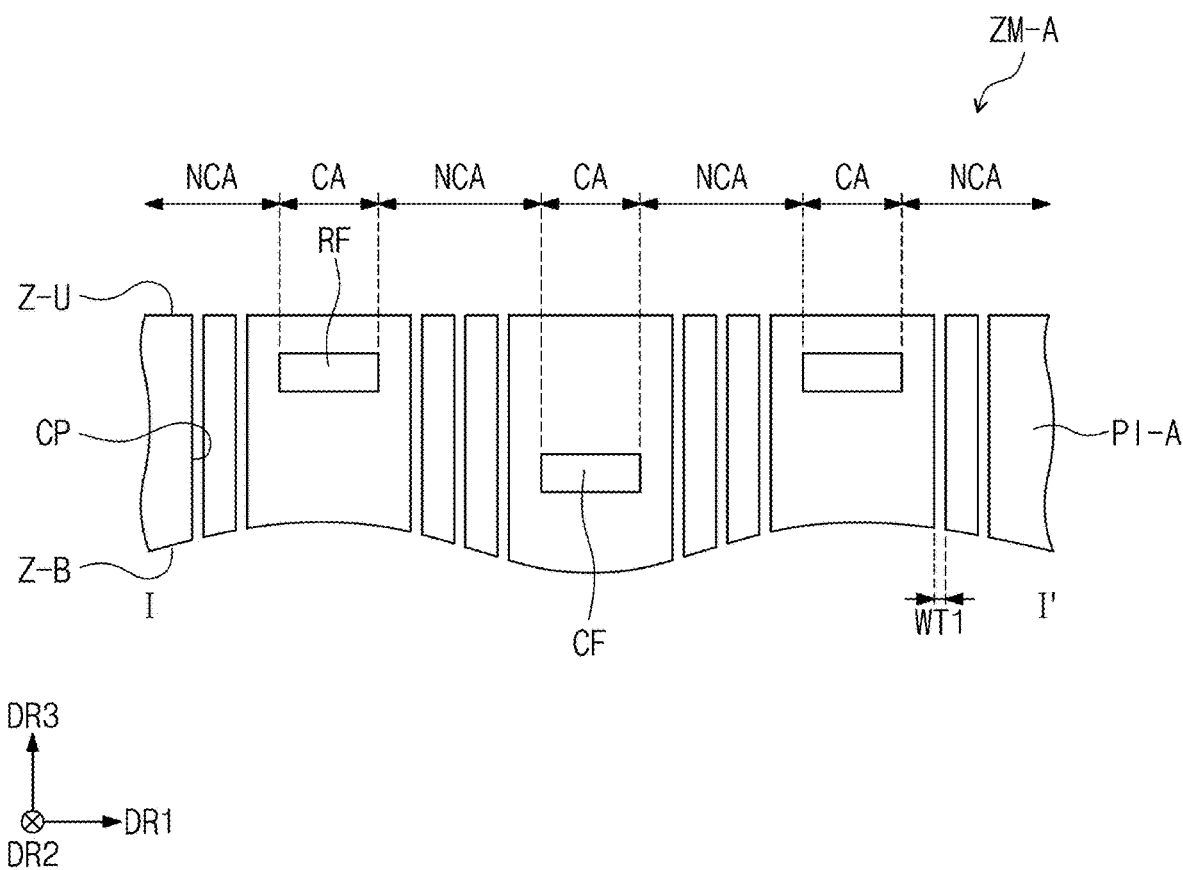
FIG. 7B is a cross-sectional view showing the digitizer taken along a line I-I' shown in FIG. 7A.

FIG. 7A is a plan view showing a digitizer ZM-A according to an embodiment of the present disclosure, and FIG. 7B is a cross-sectional view showing the digitizer ZM-A taken along a line I-I' shown in FIG. 7A. In FIGS. 7A and 7B, the same reference numerals denote the same elements in FIGS. 1A to 1D, 2A to 2C, 3A, 3B, and 4 to 6, and thus, detailed descriptions of the same elements will be omitted.

Referring to FIGS. 7A and 7B, the digitizer ZM-A may include a base member PI-A, a first sensing line RF, and a second sensing line CF.

The digitizer ZM-A according to the present embodiment may be provided with a through-hole CP penetrating the base member PI-A. The through-hole CP may be surrounded by the first sensing line RF and the second sensing line CF. However, the location of the through-hole CP according to the invention should not be limited thereto or thereby. The through-hole CP may overlap at least one of the sensing lines RF and CF in another embodiment.

The through-hole CP of the present disclosure may be formed by penetrating the base member PI-A from the front surface Z-U to the rear surface Z-B. As another way, the through-hole CP may be formed by removing a portion of the base member PI-A from the front surface Z-U or a portion of the base member PI-A from the rear surface Z-B in the third direction DR3 (i.e., the thickness direction of the digitizer ZM-A). However, the way to make the through-hole CP according to the invention should not be limited thereto or thereby.

In addition, the through-hole CP may be provided in plural, and the through-holes CP may be arranged in a matrix form of four rows by three columns within one block defined by the first sensing lines RF and the second sensing lines CF. However, the arrangement of through-holes CP according to the invention should not be limited thereto or thereby. As another way, the through-holes CP may be randomly arranged.

Further, the through-hole CP has a rectangular shape when viewed in a plane (i.e., plan view). However, the shape of the through-hole CP according to the invention should not be limited thereto or thereby. The through-hole CP may have a circular shape, an oval shape, or a polygonal shape in another embodiment.

The first sensing line RF described in the following drawings may be one of the first sensing lines RF1-1, RF1-2, RF1-3, RF2-1, RF2-2, and RF2-3 described with reference to FIG. 5, and the second sensing line CF may be one of the second sensing lines CF1-1, CF1-2, CF1-3, CF2-1, CF2-2, and CF2-3 described with reference to FIG. 5.

The base member PI-A may include the front surface Z-U adjacent to the display module DM and the rear surface Z-B opposite to the front surface Z-U, which are described with reference to FIG. 6. The base member PI-A may include a line area CA in which the sensing lines RF and CF are disposed and a non-line area NCA disposed between the sensing lines RF and CF. In other words, the non-line area NCA is disposed between two adjacent line areas CA.

The base member PI-A may be provided with the through-hole CP defined therethrough from the front surface Z-U to the rear surface Z-B. In an embodiment, the through-hole CP may overlap the non-line area NCA and may be spaced apart from the line area CA in a plan view.

The through-hole CP has a first width WT1 equal to or greater than about 10 micrometers (μm) and equal to or smaller than about 300 μm in the first direction DR1. The first width WT1 of the through-hole CP may be defined by a width measured in the first direction DR1. The first direction DR1 crosses the second direction DR2 in which the folding axes AX1 and AX2 described with reference to FIGS. 1B and 1D extend. If the first width WT1 is smaller than about 10 μm, the folding characteristics of the display module DM may be deteriorated by the digitizer ZM disposed under the display module DM. If the first width WT1 is greater than about 300 μm, uneven portions formed by the through-hole CP may be viewed to the user through the display module DM.

The through-hole CP has a fifth width WT5 equal to or greater than about 1 millimeters (mm) and equal to or smaller than about 5 mm in the second direction DR2 (See FIG. 7A). The fifth width WT5 may be defined by a width measured in the same direction as the direction in which the folding axes AX1 and AX2 extend. The through-hole CP has a depth equal to or greater than about 10 μm and equal to or smaller than about 50 μm in the third direction DR3.

In an embodiment, the first sensing line RF and the second sensing line CF may be spaced apart from each other and may be embedded in the base member PI-A. In the present disclosure, the expression "embedded" may mean that the first sensing line RF and the second sensing line CF are disposed inside the base member PI-A regardless of the distinction of layers.

According to the present disclosure, as the base member PI-A is provided with the through-hole CP defined therethrough from the front surface Z-U to the rear surface Z-B, a stress applied to the digitizer ZM-A when the digitizer ZM-A is folded may be effectively reduced. Accordingly, the reliability of the digitizer ZM-A may be improved, and the folding characteristics of the electronic apparatus EA may be improved.

Figure 8:
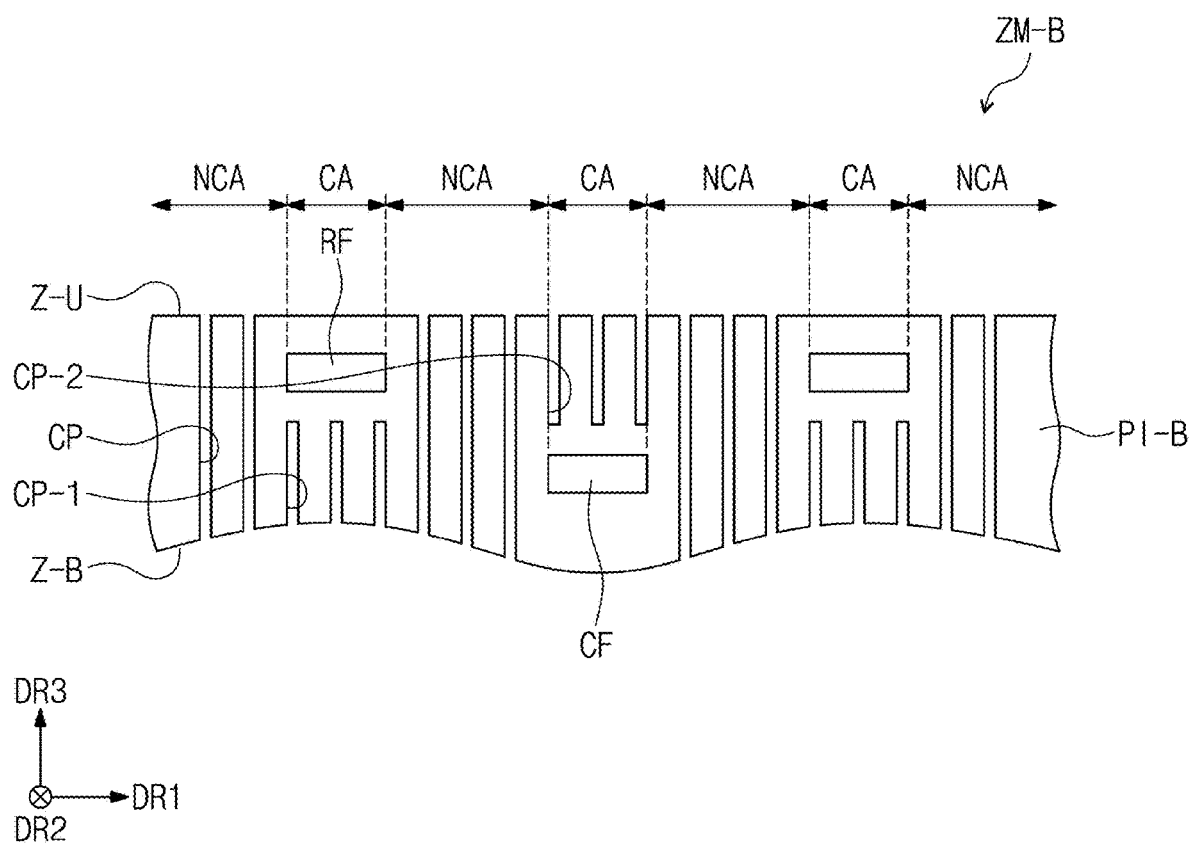
FIG. 8 is a cross-sectional view showing a digitizer according to an embodiment of the present disclosure.
Figure 9:
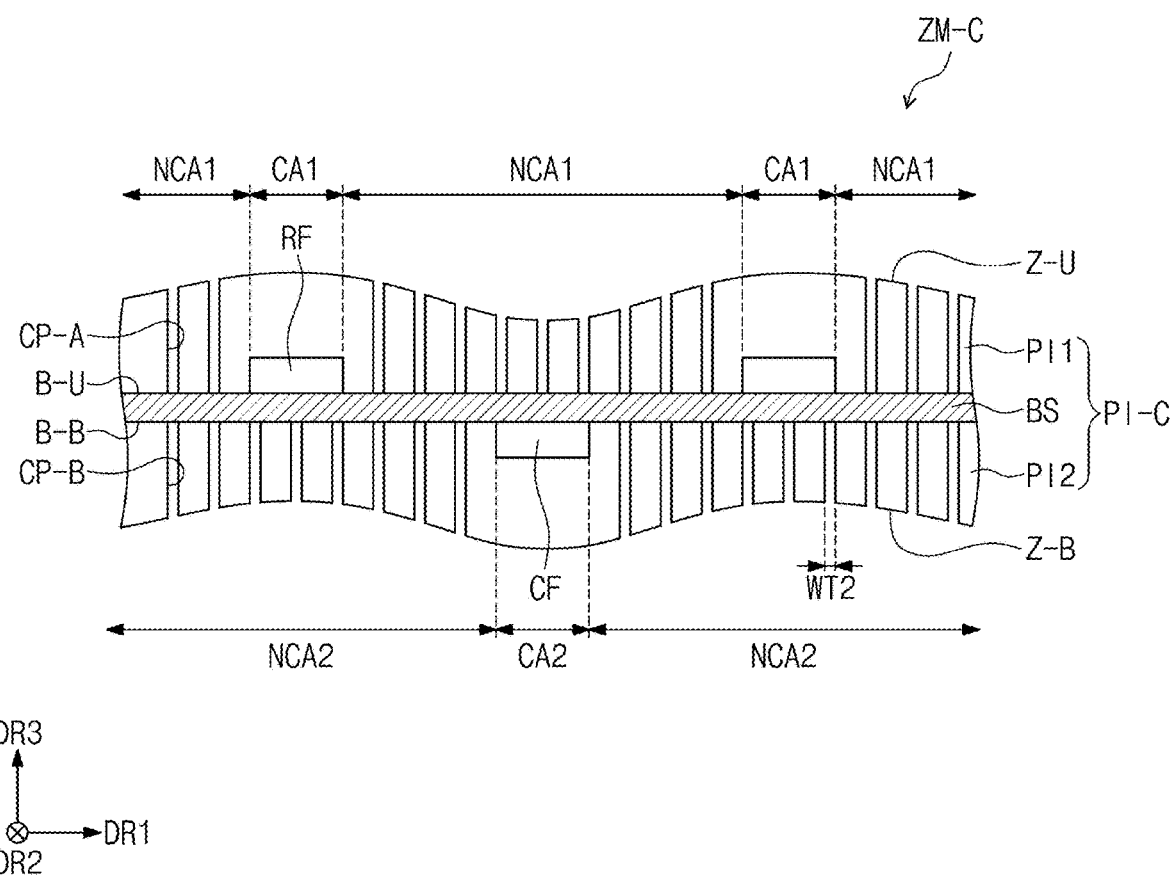
FIG. 9 is a cross-sectional view showing a digitizer according to another embodiment of the present disclosure.
Figure 10:
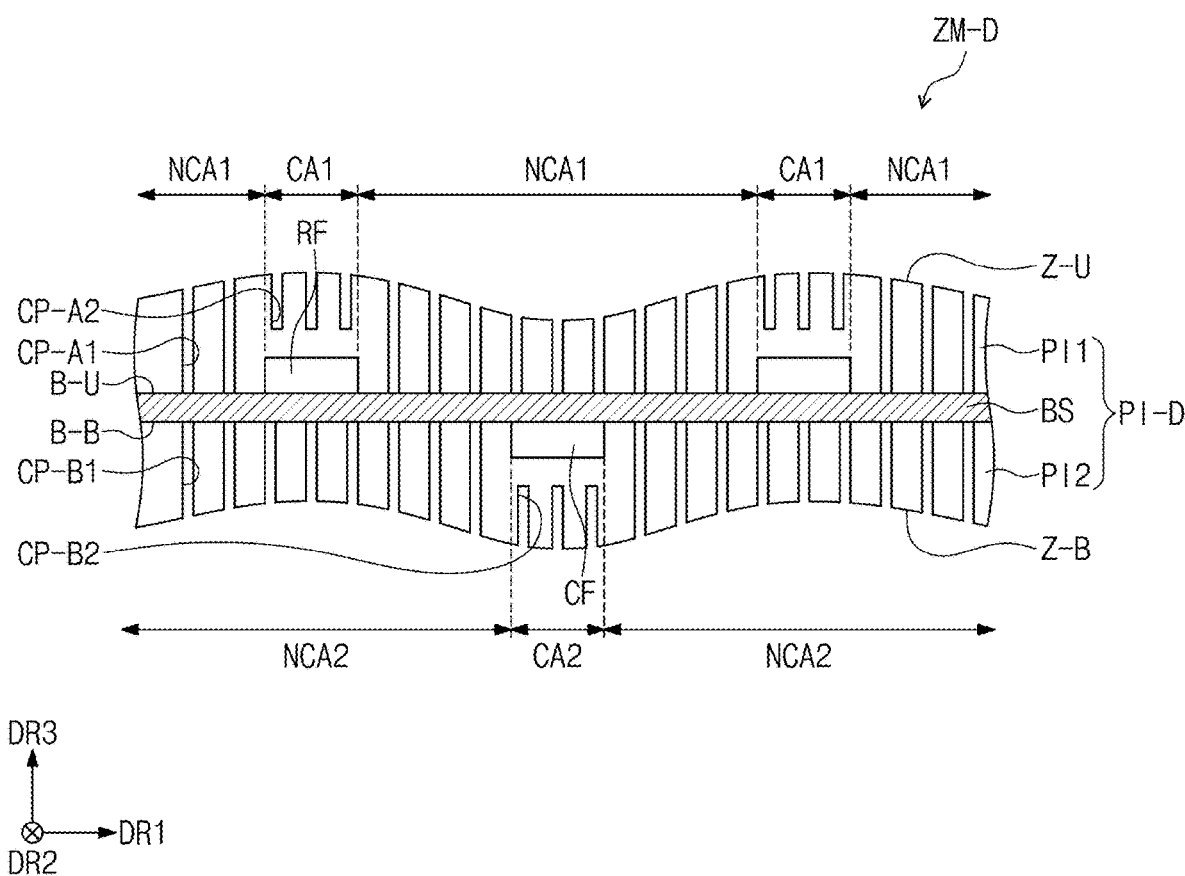
FIG. 10 is a cross-sectional view showing a digitizer according to still another embodiment of the present disclosure.
Figure 11:
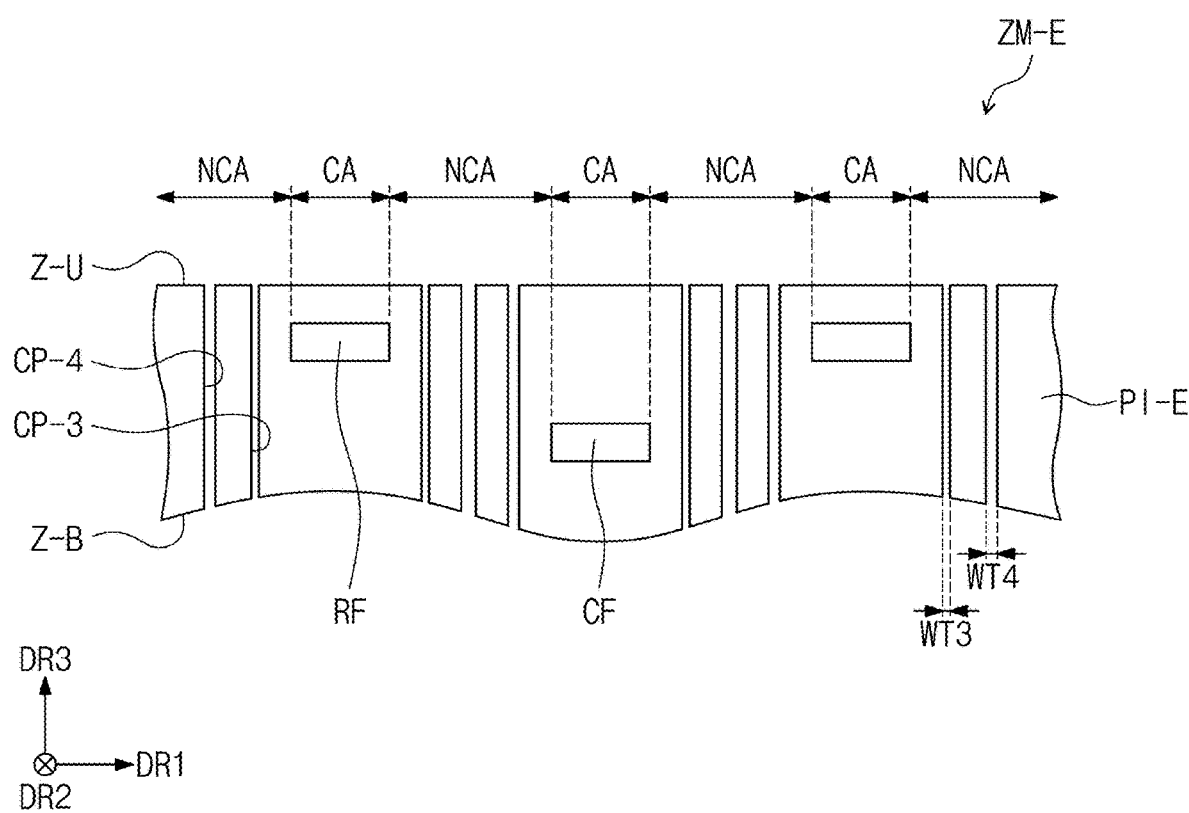
FIG. 11 is a cross-sectional view showing a digitizer according to yet another embodiment of the present disclosure.

FIG. 8 is a cross-sectional view showing a digitizer ZM-B according to an embodiment of the present disclosure. FIG. 9 is a cross-sectional view showing a digitizer ZM-C according to another embodiment of the present disclosure. FIG. 10 is a cross-sectional view showing a digitizer ZM-D according to still another embodiment of the present disclosure. FIG. 11 is a cross-sectional view showing a digitizer ZM-E according to yet another embodiment of the present disclosure. FIGS. 8 to 11 show cross-sections corresponding to the digitizer shown in FIG. 7B. In FIGS. 8 to 11, the same reference numerals denote the same elements in FIGS. 1A to 7B, and thus, detailed descriptions of the same elements will be omitted.

Referring to FIG. 8, the digitizer ZM-B according to the embodiment may include a base member PI-B, a first sensing line RF, and a second sensing line CF.

The base member PI-B may include a front surface Z-U and a rear surface Z-B opposing the front surface Z-U. The base member PI-B may include a line area CA in which the sensing lines RF and CF are disposed and a non-line area NCA disposed between the sensing lines RF and CF. In other words, the non-line area NCA is disposed between two adjacent line areas CA.

In the present embodiment, the base member PI-B may be provided with a through-hole CP and additional holes CP-1 and CP-2, which penetrate at least a portion of the base member PI-B.

The through-hole CP may overlap the non-line area NCA in a plan view and may be spaced apart from the line area CA. The through-hole CP may penetrate the base member PI-B from the front surface Z-U to the rear surface Z-B.

A first additional hole CP-1 may overlap the line area CA in which the first sensing line RF is disposed and may be defined by removing a portion of the base member PI-B from the rear surface Z-B of the base member PI-B. The first additional hole CP-1 may be defined from the rear surface Z-B with a certain depth in the third direction DR3 so as not to expose the first sensing line RF.

A second additional hole CP-2 may overlap the line area CA in which the second sensing line CF is disposed and may be defined by removing a portion of the base member PI-B from the front surface Z-U of the base member PI-B. The second additional hole CP-2 may be defined from the front surface Z-U with a certain depth in the third direction DR3 so as not to expose the second sensing line CF.

However, the location of through-holes according to the invention should not be limited thereto or thereby. The digitizer ZM-B may include an additional through-hole that overlaps the line area CA in which the first sensing line RF is disposed and is defined by removing a portion of the base member PI-B from the front surface Z-U of the base member PI-B or may further include an additional through-hole that overlaps the line area CA in which the second sensing line CF is disposed and is defined by removing a portion of the base member PI-B from the rear surface Z-B of the base member PI-B in another embodiment.

Referring to FIG. 9, the digitizer ZM-C may include a base member PI-C, first sensing lines RF, and second sensing lines CF.

In the present embodiment, the base member PI-C may include a base layer BS, a first photosensitive resin layer PI1, and a second photosensitive resin layer PI2. The base layer BS may include a front surface B-U on which the first sensing lines RF is disposed and a rear surface B-B on which the second sensing lines CF is disposed. The front surface B-U may face the rear surface B-B.

The base layer BS may include polyimide (PI). The first photosensitive resin layer PI1 and the second photosensitive resin layer PI2 may include photosensitive polyimide.

Different from the base member PI-A of FIG. 7B in which the sensing lines RF and CF are embedded in the base member PI-A regardless of the distinction of layers, the sensing lines RF and CF according to the present embodiment may be disposed on the front surface B-U and the rear surface B-B of the base layer BS, respectively, and may be covered by the photosensitive resin layer PI1 and PI2, respectively.

The base member PI-C may include a front surface Z-U and a rear surface Z-B opposing the front surface Z-U. In the present embodiment, the first photosensitive resin layer PI1 may provide the front surface Z-U of the base member PI-C, and the second photosensitive resin layer PI2 may provide the rear surface Z-U of the base member PI-C.

The front surface B-U of the base layer BS may include a first line area CA1 in which the first sensing line RF is disposed and a first non-line area NCA1 defined between two adjacent first line areas CA1.

The rear surface B-B of the base layer BS may include a second line area CA2 in which the second sensing line CF is disposed and a second non-line area NCA2 defined between two adjacent second line areas CA2.

In the present embodiment, the base member PI-C may be provided with through-holes CP-A and CP-B penetrating at least a portion of the base member PI-C.

The first through-hole CP-A may overlap the first non-line area NCA1 in a plan view and may penetrate the first photosensitive resin layer PI1 to expose the front surface B-U of the base layer BS.

The second through-hole CP-B may overlap the second non-line area NCA2 in a plan view and may penetrate the second photosensitive resin layer PI2 to expose the rear surface B-B of the base layer BS.

The through-holes CP-A and CP-B each have a second width WT2 equal to or greater than about 10 μm and equal to or smaller than about 300 μm in the first direction DR1. The second width WT2 of the through-holes CP-A and CP-B may be defined by a width measured in the first direction DR1. The first direction DR1 crosses the second direction DR2 in which the folding axes AX1 and AX2 described with reference to FIGS. 1B and 1D extend.

If the second width WT2 is smaller than about 10 μm, the folding characteristics of the display module DM may be deteriorated due to the digitizer ZM-C disposed under the display module DM. If the second width WT2 is greater than about 300 μm, uneven portions formed by the first through-hole CP-A may be viewed to the user through the display module DM.

The first through-hole CP-A may overlap the first non-line areas NCA1 and may be spaced apart from the first line area CA1 in a plan view. The second through-hole CP-B may be overlap the second non-line areas NCA2 and may be spaced apart from the second line area CA2 in a plan view. Accordingly, the through-holes CP-A and CP-B may be spaced apart from the line areas CA1 and CA2.

Referring to FIG. 10, the digitizer ZM-D may include a base member PI-D, a first sensing line RF, and a second sensing line CF.

In the present embodiment, the base member PI-D may include a base layer BS, a first photosensitive resin layer PI1, and a second photosensitive resin layer PI2. The base layer BS may include a front surface B-U on which the first sensing lines RF are disposed and a rear surface B-B on which the second sensing lines CF are disposed. The front surface B-U may face the rear surface B-B.

The base layer BS may include polyimide (PI). The first photosensitive resin layer PI1 and the second photosensitive resin layer PI2 may include photosensitive polyimide.

The base member PI-D may include a front surface Z-U and a rear surface Z-B opposing the front surface Z-U. In the present embodiment, the first photosensitive resin layer PI1 may provide the front surface Z-U of the base member PI-D, and the second photosensitive resin layer PI2 may provide the rear surface Z-B of the base member PI-D.

The front surface B-U of the base layer BS may include a first line area CA1 in which the first sensing line RF is disposed and a first non-line area NCA1 defined between the first sensing lines.

The rear surface B-B of the base layer BS may include a second line area CA2 in which the second sensing line CF is disposed and a second non-line area NCA2 defined between the second sensing lines.

In the present embodiment, the base member PI-D may be provided with through-holes CP-A1 and CP-B1 and additional holes CP-A2 and CP-B2, which penetrate at least a portion of the base member PI-D.

The first through-hole CP-A1 may overlap the first non-line area NCA1 in a plan view and may penetrate the first photosensitive resin layer PI1 to expose the front surface B-U of the base layer BS.

The second through-hole CP-B1 may overlap the second non-line area NCA2 in a plan view and may penetrate the second photosensitive resin layer PI2 to expose the rear surface B-B of the base layer BS.

The first additional hole CP-A2 may overlap the first line area CA1 in which the first sensing line RF is disposed and may be defined by removing a portion of the first photosensitive resin layer PI1 from the front surface of the first photosensitive resin layer PI1 (i.e., the front surface Z-U of the base member PI-D). The first additional hole CP-A2 may be defined from the front surface of the first photosensitive resin layer PI1 with a certain depth in the third direction DR3 so as not expose the first sensing line RF.

The second additional hole CP-B2 may overlap the second line area CA2 in which the second sensing line CF is disposed and may be defined by removing a portion of the second photosensitive resin layer PI2 from the rear surface of the second photosensitive resin layer PI2 (i.e., the rear surface Z-B of the base member PI-D). The second additional hole CP-B2 may be defined from the rear surface of the second photosensitive resin layer PI2 with a certain depth in the third direction DR3 so as not expose the second sensing line CF.

Referring to FIG. 11, the digitizer ZM-E may be provided with through-holes CP-3 and CP-4 penetrating a base member PI-E.

The base member PI-E may include a front surface Z-U and a rear surface Z-B opposing the front surface Z-U. The base member PI-E may include a line area CA in which sensing lines RF and CF are disposed and a non-line area NCA defined between the sensing lines RF and CF.

In an embodiment, the through-holes CP-3 and CP-4 may have different widths from each other in the first direction DR1. For example, the third through-hole CP-3 may have a third width WT3, and the fourth through-hole CP-4 may have a fourth width WT4. The fourth width WT4 may be greater than the third width WT3. Each of the third width WT3 and the fourth width WT4 may be equal to or greater than about 10 μm and equal to or smaller than about 300 μm.

FIG. 11 shows two through-holes CP-3 and CP-4 having different widths from each other. However, the number of kinds of the through-holes according to the invention should not be limited thereto or thereby. The base member PI-E may be provided with three or more kinds of through-holes having different widths from each other in another embodiment, and the number of kinds should not be particularly limited.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A digitizer comprising:
   a base member comprising a front surface and a rear surface opposing the front surface;
   first sensing lines disposed on the base member, arranged in a first direction, and extending in a second direction crossing the first direction; and
   second sensing lines disposed on the base member, spaced apart from the first sensing lines, arranged in the second direction, and extending in the first direction,
   wherein the digitizer detects an external input by an electromagnetic resonance (EMR) method,
   the base member is foldable about an imaginary folding axis extending in the second direction and is provided with a through-hole penetrating at least a portion thereof, and
   the through-hole is surrounded by the first sensing lines and the second sensing lines, and
   the through-hole has a width equal to or greater than about 10 micrometers and equal to or smaller than about 300 micrometers in the first direction.

2. The digitizer of claim 1, wherein the through-hole is provided in plural, and the through-holes are arranged in the first direction and the second direction to be spaced apart from each other.

3. The digitizer of claim 1, wherein the first and second sensing lines are embedded in the base member.

4. The digitizer of claim 3, wherein the base member comprises:

a first line area in which the first sensing line is disposed, the first sensing lines being adjacent to the front surface of the base member;

a second line area in which the second sensing line is disposed, the second sensing lines being adjacent to the rear surface of the base member; and a non-line area defined between the first line area and the second line area in the plan view, wherein the through-hole overlaps the non-line area in the plan view and penetrates the base member from the front surface of the base member to the rear surface of the base member.

5. The digitizer of claim 4, wherein the base member defines a first additional hole which overlaps the first line area in the plan view and is defined from the rear surface of the base member with a certain depth.

6. The digitizer of claim 4, wherein the base member defines a second additional hole which overlaps the second line area in the plan view and is defined from the front surface of the base member with a certain depth.

7. The digitizer of claim 1, wherein the base member comprises polyimide.

8. The digitizer of claim 1, wherein the through-hole comprises a first through-hole and a second through-hole which have different widths from each other.

9. The digitizer of claim 1, wherein the through-hole has a width equal to or greater than about 1 millimeter and equal to or smaller than about 5 millimeters in the second direction.

10. The digitizer of claim 1, wherein the through-hole has a depth equal to or greater than about 10 micrometers and equal to or smaller than about 50 micrometers in a third direction, the third direction crossing the first direction and the second direction.

11. An electronic apparatus comprising:
a window;
a display module disposed under the window; and
a digitizer disposed under the display module,
wherein the digitizer comprises:
a base member comprising a front surface adjacent to the display module and a rear surface opposing the front surface; and
first and second sensing lines disposed on the base member, arranged in a first direction and a second direction, respectively, spaced apart and insulated from each other, the second direction crossing the first direction, wherein the digitizer detects an external input by an electromagnetic resonance (EMR) method, the display module is foldable about an imaginary folding axis extending in the second direction, the digitizer is provided with a through-hole penetrating at least a portion of the base member, and the through-hole is surrounded by the first sensing lines and the second sensing lines, and the through-hole has a width equal to or greater than about 10 micrometers and equal to or smaller than about 300 micrometers in the first direction.

12. The electronic apparatus of claim 11, wherein the first and second sensing lines are embedded in the base member.

13. The electronic apparatus of claim 12, wherein the base member comprises:

a first line area in which the first sensing line is disposed, a second line area in which the second sensing line is disposed, and a non-line area defined between the first line area and the second line area in the plan view, wherein the through-hole overlaps the non-line area in the plan view and penetrates the base member from the front surface of the base member to the rear surface of the base member.

14. The electronic apparatus of claim 13, wherein the base member defines:

a first additional hole overlapping the first line area and defined from the rear surface of the base member with a certain depth; and a second additional hole overlapping the second line area and defined from the front surface of the base member with a certain depth.

15. The electronic apparatus of claim 11, wherein the through-hole has a width equal to or greater than about 1 millimeter and equal to or smaller than about 5 millimeters in the second direction.

16. The electronic apparatus of claim 11, wherein the through-hole has a depth equal to or greater than about 10 micrometers and equal to or smaller than about 50 micrometers in a third direction, the third direction crossing the first direction and the second direction.

* * * * *